(12) United States Patent
Kameyama

(10) Patent No.: US 6,330,134 B2
(45) Date of Patent: *Dec. 11, 2001

(54) HEAD ASSEMBLY AND STORAGE DEVICE

(75) Inventor: Masaki Kameyama, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/271,961

(22) Filed: Mar. 18, 1999

(30) Foreign Application Priority Data

Mar. 27, 1998 (JP) .................................. 10-081345
May 12, 1998 (JP) .................................. 10-129086

(51) Int. Cl.⁷ .............................. G11B 5/60; G11B 21/21
(52) U.S. Cl. ..................................... 360/245.4; 360/234.6
(58) Field of Search ........................ 34/234.6; 360/245, 360/245.1, 245.3–245.6

(56) References Cited

U.S. PATENT DOCUMENTS

| | | | | |
|---|---|---|---|---|
| 5,299,080 | * | 3/1994 | Mizuno et al. ................ | 360/103 |
| 5,299,081 | | 3/1994 | Hatch et al. . | |
| 5,508,863 | * | 4/1996 | Goto et al. .................... | 360/104 |
| 5,608,590 | * | 3/1997 | Ziegler et al. ................. | 360/104 |
| 5,661,619 | * | 8/1997 | Goss .............................. | 360/104 |
| 6,115,221 | * | 9/2000 | Utsunomiya ................... | 360/245.1 |

FOREIGN PATENT DOCUMENTS

| | | |
|---|---|---|
| 0 397 896 A1 | 11/1990 | (EP) . |
| 60-163286 | 8/1985 | (JP) . |
| 2-239482 | 9/1990 | (JP) . |
| 5-282640 | 10/1993 | (JP) . |
| 08-124338 A | 5/1996 | (JP) . |

* cited by examiner

Primary Examiner—William Klimowicz
(74) Attorney, Agent, or Firm—Greer, Burns & Crain, Ltd.

(57) ABSTRACT

A head assembly for an information storage device that includes a head slider with a read/write element for reading/recording information to/from a disk and a suspension for supporting the head slider. The suspension includes a generally planar sheet that extends in a longitudinal direction from a first end to second end and an arm attaching portion located near the first end of the generally planar sheet of the suspension. The arm attaching portion is adapted to be attached to a head arm. The suspension also includes a slider attaching portion positioned near the second end of the generally planar sheet of the suspension, where the slider attaching portion extends generally in the longitudinal direction and is surrounded by a generally U-shaped opening in the generally planar sheet. The slider attaching portion faces a securing surface of the head slider. At least one of the slider attaching portion of the suspension and the securing surface of the head slider includes a nonplanar portion, and the head slider and the suspension are affixed to each other at the nonplanar portion, whereby the effects of torsion upon the alignment of the head slider are mitigated by the nonplanar portion. Preferably, the nonplanar portion includes a curved portion.

18 Claims, 15 Drawing Sheets

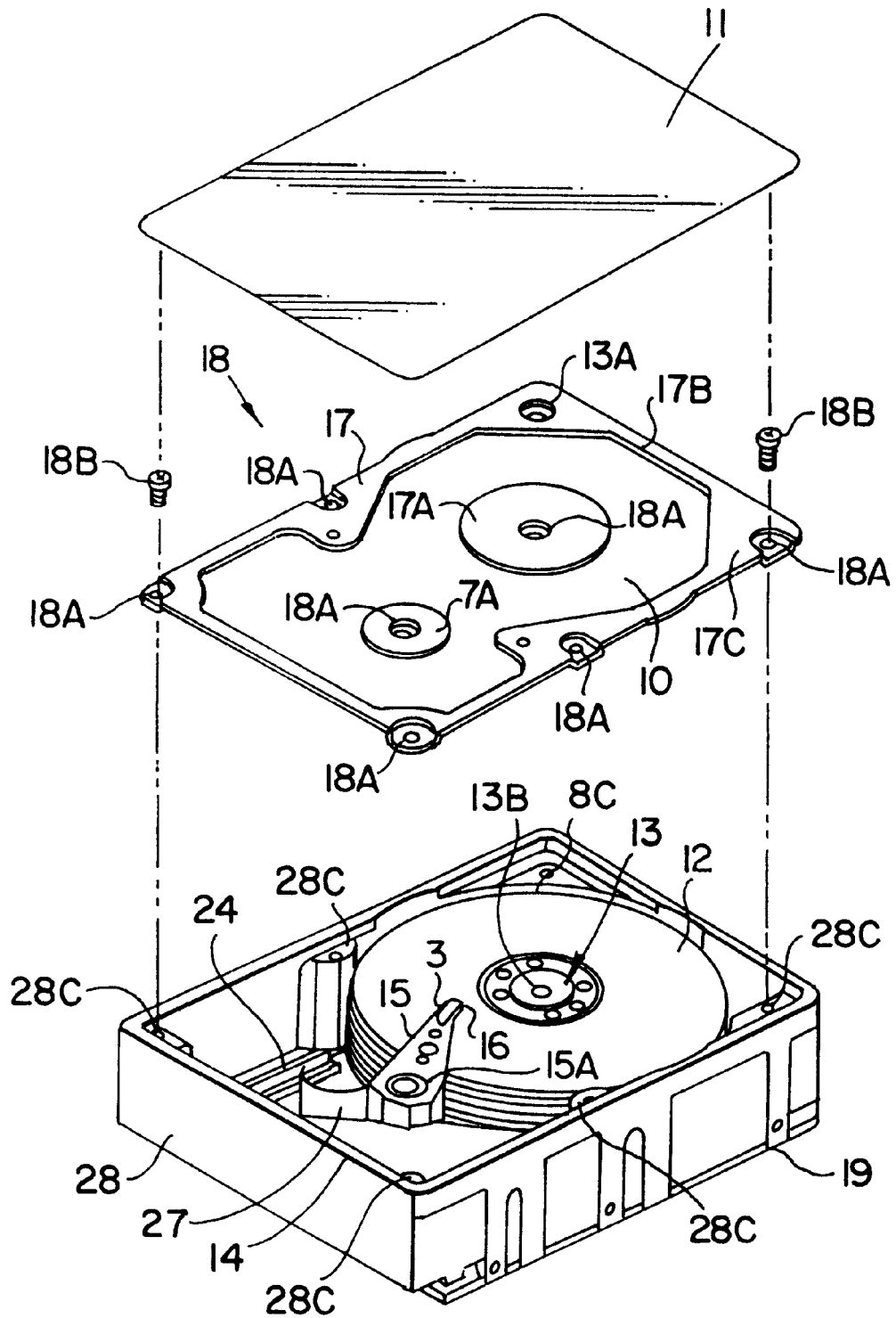

ADJUSTING THE VERTICAL POSITION

ADJUSTING THE LONGITUDINAL POSITION

APPLICATION OF ADHESIVE

HEAD ASSEMBLY AND STORAGE DEVICE

The present invention relates to a head assembly for reading and/or writing information, which has a head slider positioned at a predetermined position with respect to a storage medium, and it also relates to storage devices such as magnetic disk devices (floppy disk devices, hard disk devices, etc.), optical disk devices and tape disk devices.

BACKGROUND OF THE INVENTION

The conventional storage device is constructed to rotate a disk so that a head slider is caused to float a small distance from the surface of the disk, enabling the head slider to move in the radial direction of the disk. This conventional head slider is generally provided with a head element for recording and/or reading information.

In current information storage devices using mageopolitical disks, the head slider has a magnetic head for reading and/or writing a bias magnetic field to/from the head slider. In addition, an optical head of an objective lens or luminous elements for leading the light to the disk can also be mounted upon the head slider.

Most types of head sliders are supported by suspensions having elasticity which allows for flexing of the head slider towards or away from the disk. The head slider floats a slight distance from the surface of the disk due to the action caused by the air flow generated on the rotating disk surface, i.e., the head floats due to the principles of dynamic air pressure bearings. Higher recording densities and increasing miniaturization are currently being achieved with disk devices, and head sliders are being designed for lower floating heights to achieve miniaturization and lighter weight. However, if the floating height of the slider is designed so that it is too low, the head slider comes into contact with the disk surface due to floating level fluctuations. Such a condition has not been a problem in the past, but eventually, the probability of the slider coming into contact with the disk will be too high, and reliability will reduced because of damage occurring to the head slider and/or the head element parts.

FIG. 1(A) shows a prior art head assembly. The head assembly 20 is generally composed of a head slider 26 and a suspension 21. The suspension 21 is formed by press punching one sheet of an SUS plate, and has an arm attaching surface 23 which is to be attached to an arm of the disk device. The arm attaching surface 23 is formed with an attaching hole 23A, and is furnished with a spacer 23B to ensure that the attaching strength is adequate.

The suspension 21 is also provided with a slider attaching portion 25D for attaching the head slider 26 to the suspension 21 at the opposite end of the arm attaching surface 23. The adhesion surface 26T of the head slider 26 is firmly secured to the suspension 21 by means of an adhesive 22 coated on the slider attaching portion 25D. The slider attaching portion 25D is created by a generally U-shaped hole 25 formed around the perimeter thereof, and the slider attaching portion 25D is supported by three connected beams 25A, 25B, 25C.

The structure of this suspension 21 enables the head slider 26 to be responsive to the air flowing backwards, forwards, to the right, and to the left. However, since the suspension 21 is, as stated above, press-formed, it is often twisted in direction "a" or in direction "b" due to stresses created during forming. The slider attaching portion 25D is, accordingly, affected by the twisting, though the arm attaching surface 23 of the disk device is designed to be positioned so that it is parallel to the disc surface. Furthermore, since the slider attaching portion 25D and the adhesion surface 26T of the head slider are planar, if the head slider 26 is attached to a twisted slider attaching portion 25D, the head slider 26 will be inclined with respect to the disk surface.

In summary, when the slider attaching portion 25D is twisted at an angle of α/2 in direction "a" with respect to the attaching surface 23, the surface 26D of the head slider 26 facing the disk (in this case the lower surface of the slider) is inclined similar to plane 29A of FIG. 1(A). Thus, because of this inclination, there is a reduction in the floating height of the read/write element 26A (which may be any type of element for reading and/or writing information to/from a disk). Additionally, the frequency of contact of the slider with the disk is also increased. These conditions often result in damage to the head, the suspension and/or the disk.

Conversely, when the slider attaching surface 25D is twisted at an angle of α/2 in direction "b" with respect to the attaching surface 23, the surface 26D of the head slider 26 facing the disk is inclined in a manner similar to plane 29B. Thus, the floating height of the read/write element 26A is increased, and the distance between the head and the recording film of the disk is increased so that the recording and/or reading characteristics are degraded.

FIG. 1(B) shows a graph of the floating height of the head slider 20 along different portions of radius of the disk. Line 41 represents the case with no torsion existing in the suspension, and the floating height is constant from the inner side of the disk to the outer side and where the head slider floats at a predetermined height, irrespective of its position on the disk. Line 42 represents the case with torsion existing in the suspension, and where the floating height is reduced going from the inner side of the disk to the outer side, resulting in instability. Since the floating height of the head slider is lower than the designed value, the probability of the head slider coming into contact with the disk is increased. Thus, to secure the floating stability of the head slider, there should be no torsion in the suspension.

Accordingly, in view of the problems discussed above, an objective of the present invention is to provide a head assembly and a storage device which are capable of improving the floating stability of the head slider, as well as improving the reliability of the storage device. It is another objective of the invention to provide a head assembly and a storage device which can provide a highly precise parallel relationship between the surface of the head slider facing a storage medium and the attaching surface of the support plate at the disk device side.

BRIEF SUMMARY OF THE INVENTION

Briefly, with head assembly of the present invention, it is possible to arrange the surface of the head slider facing the disk to be parallel to the disk surface, even if there is some torsion or twisting in the suspension. The effects of torsion can be mitigated against by using a nonplanar or curved portion, on the suspension, for attaching the slider to the suspension. Alternatively, it is also possible to mitigate the effects of torsion by using a nonplanar or curved portion on the surface of the slider where it is attached to the suspension. As an additional alternative, it is also possible to have nonplanar or curved portions on both the suspension and the slider attaching surface. As a result of the nonplanar surface (s), the read/write element will be held at a predetermined distance from the recording film of the disk. Thus, the floating height of the head slider can be held at a constant distance from both the inner and outer sides of the disk.

Accordingly, it is possible to enhance the recording and reading efficiency, durability, and reliability of the disk device by reducing the frequency of contact between the head slider and the disk.

More specifically, the present invention relates to a head assembly that includes a head slider with a read/write element for reading/recording information to/from a disk and a suspension for supporting the head slider. The suspension includes a generally planar sheet that extends in a longitudinal direction from a first end to second end and an arm attaching portion located near the first end of the generally planar sheet of said suspension. The arm attaching portion is adapted to be attached to a head arm. The suspension also includes a slider attaching portion positioned near the second end of the generally planar sheet of the suspension, where the slider attaching portion extends generally in the longitudinal direction and is surrounded by a generally U-shaped opening in the generally planar sheet. The slider attaching portion faces a securing surface of the head slider. At least one of the slider attaching portion of the suspension and the securing surface of the head slider includes a nonplanar portion, and the head slider and the suspension are affixed to each other at the nonplanar portion, whereby the effects of torsion upon the alignment of the head slider are mitigated by the nonplanar portion. Preferably, the nonplanar portion includes a curved portion.

The present invention also relates to an information storage device incorporating the above-mentioned head assembly, as well as to the suspension of that head assembly.

BRIEF DESCRIPTION OF THE DRAWINGS

Preferred embodiments of the present invention are described herein with reference to the drawings wherein:

FIG. 2 shows a disk device of the first embodiment of the present invention;

DESCRIPTION OF THE PREFERRED EMBODIMENTS

Figure 1A:
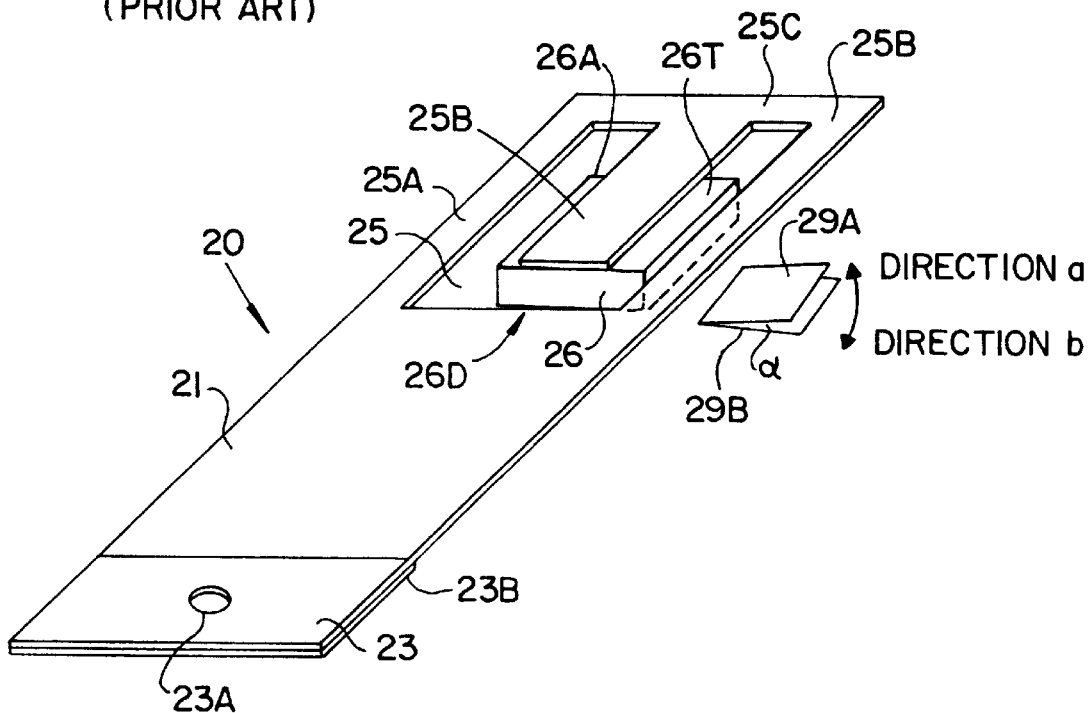
FIG. 1(A) shows perspective view of a prior art head assembly.

FIG. 2 shows a magnetic device which is an information storage device of the first embodiment. The magnetic device includes a drive base 28 for creating a housing space within the device and a cover 18. The drive base 28 and the cover 18 are connected by screws 18B, which are inserted into holes 18A and 28C. The cover 18 is formed, by using pressing techniques, with stepped portions 17A and 17C, and a groove 17B. The groove 17B is fixed with a vibration absorption plate 10. The stepped portions 17A and 17C prevent the heads of the screws from protruding, thus making the upper surface of the cover flat. Additionally, an enclosing seal 11 is applied to the overall surface of the cover. For the storage media, multiple magnetic disks 12 are mounted on a spindle motor 13 at predetermined distances from each other. A threaded hole 13B in a rotational center of the spindle motor 13 engages the threaded hole 18A of the cover, resulting in heightened rigidity and vibration resistance.

The head slider 16 has a head for accessing the disk information, and this head is mounted at the end of a suspension 3 9 which is held by an actuator arm 15. A voice coil motor 14 composed of a coil part and a magnetic circuit furnished at the actuator arm 15 is arranged in the base of the disk device. Thus, the head slider 16 is moved and controlled about a rotation shaft 15A (in the radial direction of the disk 12) by the voice coil motor 13 driving the actuator arm 15. The rotation shaft 15A of the actuator arm 15 is formed with a threaded hole, and if this hole is engaged with the threaded hole of the cover, the device's rigidity and vibration resistance are increased.

Signals read out by the head of the head slider 16 from the disk 12, as well as signals written onto the disk, travel through a flexible print circuit sheet 27, and are processed by the head control circuit. These signals continue to travel to a connector used in an opening 24, and are led to a circuit substrate 19, which is mounted with another signal processing circuit and a host controller which functions as an interface for exchanging signals with the host.

Figure 3A:
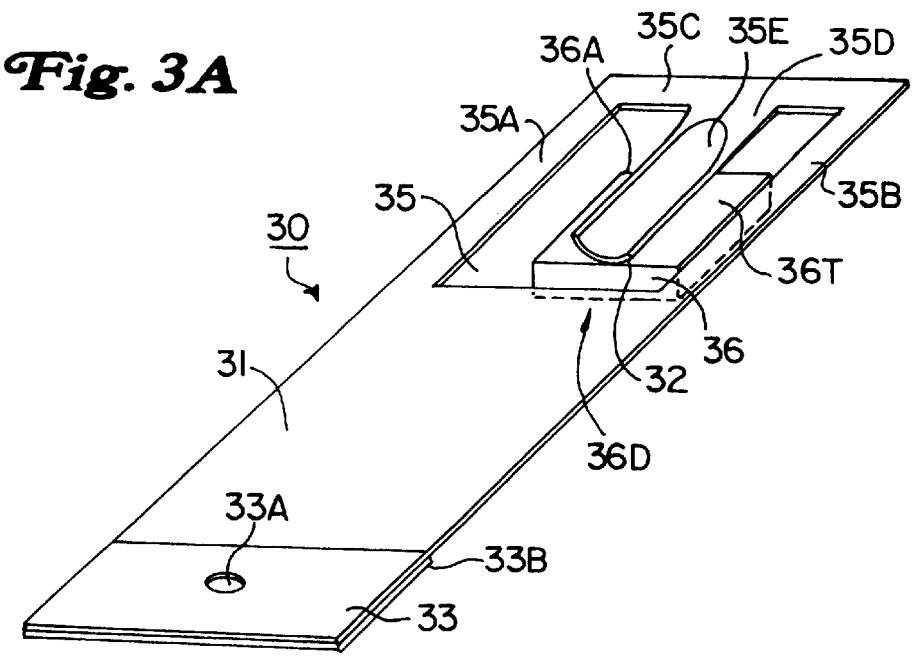
FIG. 3(A) shows a perspective view of the head assembly of the first embodiment of the present invention.
Figure 3B:
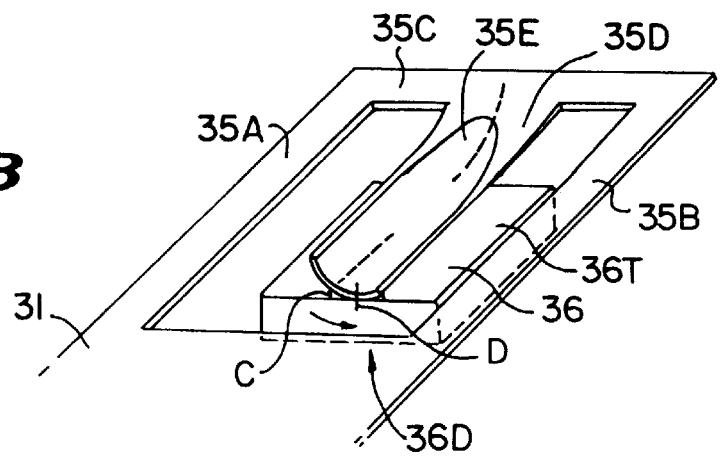
FIG. 3(B) shows an enlargement of part of FIG. 3(A)

FIG. 3(A) and FIG. 3(B) show a head assembly of the first embodiment of the present invention, where FIG. 3(A) is the entire body of the head assembly, while FIG. 3(B) is a partially enlarged view thereof. The head assembly 30 is composed of a head slider 36 and a suspension 31. The suspension 31 is formed by press-punching one sheet of an SUS material and has an attaching surface 33 for attaching the suspension 31 to the head arm of the disk device. An attaching hole 33A is formed within the attaching surface 33. A spacer 33B is furnished by laser spot welding to provide the attaching strength. In addition, the spacer 33B is formed with a caulking hole (not shown) in a position corresponding to the attaching hole 33A, and the suspension is fixed by caulking to the head arm. The suspension 31 is formed with a small R-bend (such as that formed about a roller) in the vicinity of the spacer 33B to impart elasticity for pressing the head slider 36 towards the disk surface. Further, the suspension 31 is provided with a slider attaching portion 35D for attaching the head slider 36 to an opposite end of the suspension from the head arm attaching surface 33.

The slider attaching portion 35D extends in the longitudinal direction of the head slider 36, and is, when press-formed, processed by R-bending to have a curved surface 35E (including a semicylindrical outer circumference) that extends in the longitudinal direction of the head slider 36. Alternatively, instead of the C-shaped cross-section shown, O-shaped, U-shaped or V-shaped cross-sections are also contemplated for the curved surface 35E. The slider attaching portion 35D is formed with a generally U-shaped opening 35

The securing surface 36T of the head slider 36 is a suspension attaching surface, and forms a surface contact, and not a point contact, between the slider 36 and the suspension 31. That is, since the curved surface 35E extends in the longitudinal direction (i.e., the length directions of both the slider and the suspension), it comes into contact with the securing surface 36T of the head slider in a linear manner. The slider 36 also includes a surface 36D, which is the surface that will face the disk when head assembly 30 is installed with in a disk device. For the sake of simplicity, surface 36D will be referred to as the "lower slider surface" in this embodiment, as well as in the other embodiments. However, it should be noted that if the suspension 31 is installed below its associated disk, surface 36D will not actually be below the remainder of the slider surface 36, but the designation "lower slider surface" will still be utilized.

The head slider 36 is firmly secured to the suspension 31 by means of an adhesive 32 coated fully or partially on the curved surface 35E. In each of the embodiments described herein, high-adhesion adhesives such as infrared radiation hardened resin, heat hardened resin, cemedine, etc., may be used in to affix the head slider to the suspension.

A read/write element 36A is provided on the side surface of the head slider 36 by means of thin film forming, for example, and the read/write element 36A includes a recording head section and a reading head section. It is important that the read/write element 36A maintains the required distance from a recording film of the disk in order to provide the necessary stability for recording and/or reading of signals.

The enlarged view of FIG. 3(B) shows in particular the presence of torsion in the suspension 31. The curved surface 35E and the secured surface 36T face each other when the head arm attaching surface 33 and the lower slider surface 36D are parallel to each other. However, due to the presence of torsion, the contact portion between the curved surface 35E and the secured surface 36T may not be aligned with the center line C of the curved surface 35E. This means that if the curved surface 35E and the secured surface 36T are brought into contact when the head arm attaching surface 33 and the lower slider surface 36D (which faces the disk) are in a parallel relationship, only the curved surface 35E rotates in the direction of the arrow and becomes misaligned Thus in the present invention, because there is only torsion in the curved surface 35E, the overall torsion stress of the suspension is lowered. Therefore, even if the contact portion D is not aligned with the center line C of the curved surface 35E, there is no longer the problem that the head slider 36 is fixed to the suspension 31, such that it is rotated in direction "a" or direction "b" similar to FIG. 1(A), because the (now-twisted) curved surface 35E and the secured surface 36T of the head slider 36 are affixed together by adhesive 32, where the twisting of curved surface 35E results in allowing the necessary parallel relationship of the head arm attaching surface 33 and the lower slider surface 36D to be maintained. In the FIG. 3(B) example, the arrow indicating rotation of the curved surface 35E points in a counterclockwise direction. However, since the torsion rotation characteristic of the curved surface 35E may be different for each suspension, the arrow may point in a clockwise direction in other suspensions. Also, the amount of rotation may also be varied in response to the degree of torsion stress.

When no torsion is present in the suspension, the contact portion D between the curved surface 35E and the secured surface 36T is aligned with the center line C of the curved surface 35E when the head arm attaching surface 33 and the lower slider surface 36D are parallel to each other. Thus, whether or not torsion is present, with the present invention, it is possible to arrange the head arm attaching surface 33 and the lower slider surface 36D so that they are parallel.

If the planar surface of the head arm attaching surface 33 is designed such that the planar surface of the head arm attaching surface 33 is parallel to the disk surface, it is possible for the lower slider surface 36D to also be parallel to the disk surface. Accordingly, it is then possible for the read/write element 36A to be maintained at a predetermined distance from the recording film. Thus, by applying such a head assembly 30 to the disk device of FIG. 2, a constant floating height can be maintained from the radial inner part to the radial outer part of the disk. It is therefore possible to improve the recording and reading efficiency, as well as the durability and the reliability, of the disk device by reducing the frequency of contacts between the head slider and the disk.

Figure 3C:
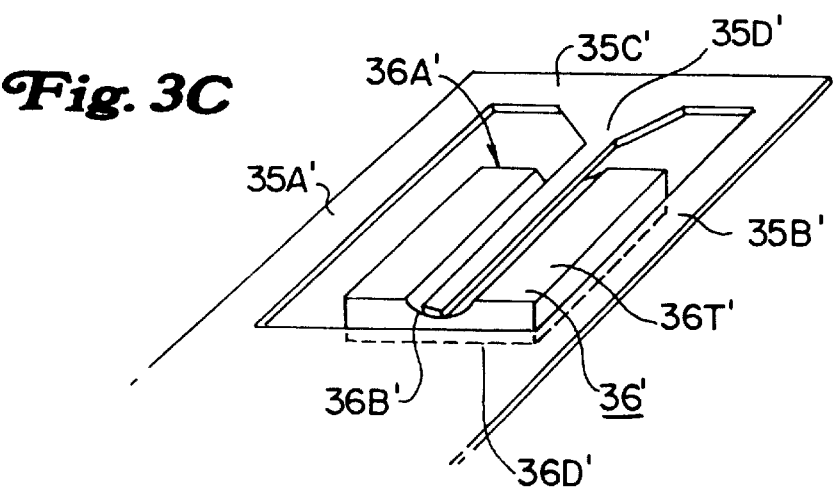
FIG. 3(C) shows a modification of the first embodiment in a view similar to that of FIG. 3(B)

In a modification of the present embodiment shown in FIG. 3(C), the head slider 36' may be formed with a curved depression 36B', and the head slider attaching portion 35D' may be planar, so that the curved depression faces the planar plate. After the curved depression 361' and the planar slider attaching portion 35D' are affixed together by an adhesive, the torsion of the support plate can be moderated in a similar manner as that described above. Of course, the surface of the head slider facing the disk and the arm attaching surface of the support plate must be kept parallel. In this modification of the first embodiment, the slider attaching portion 35D' is generally more narrow than its equivalent in FIGS. 3(A) and 3(B), so that it can be seated within the curved portion 36B' of the slider 36'.

Figure 4A:
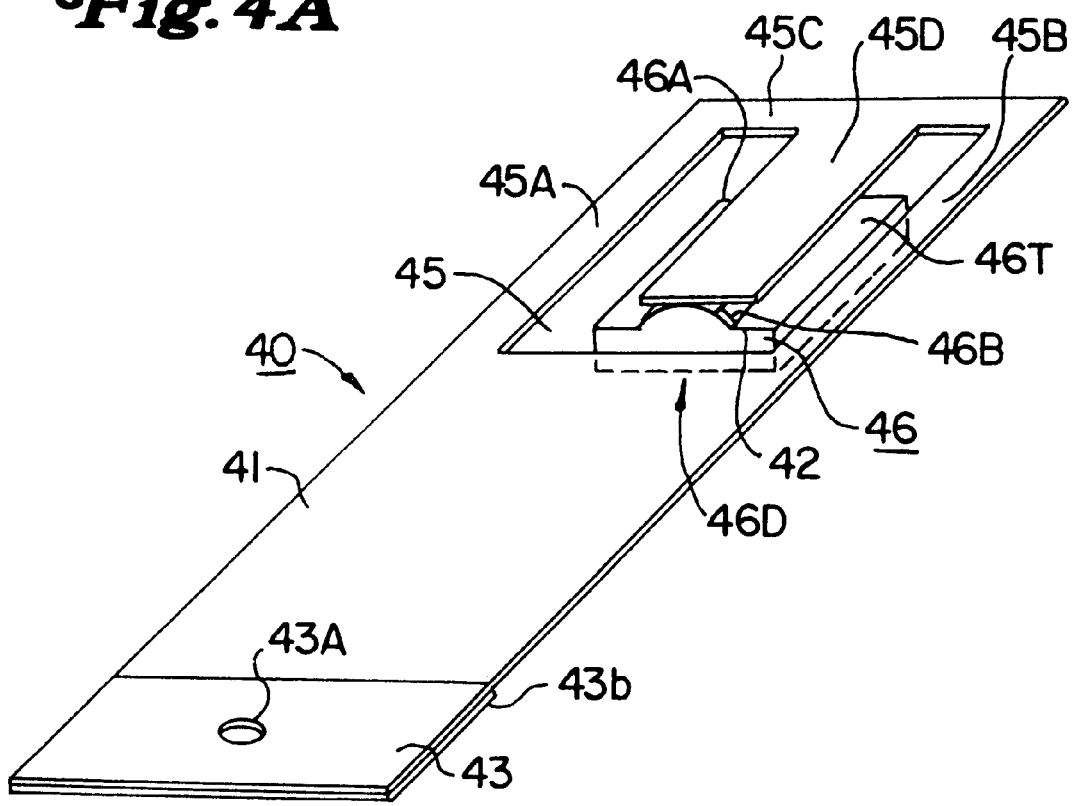
FIG. 4(A) shows a perspective view of the head assembly of the second embodiment of the present invention.
Figure 4B:
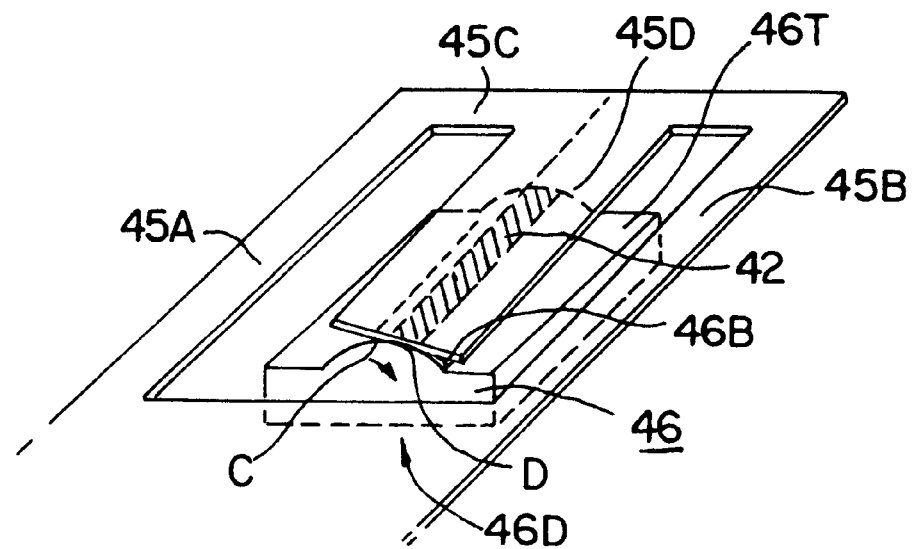
FIG. 4(B) shows an enlargement of part of FIG. 4(A)

FIG. 4(A) and FIG. 4(B) show a head assembly of a second embodiment of the invention. FIG. 4(A) shows the entire body of the head assembly, and FIG. 4(B) shows a partially enlarged view.

The head assembly 40 is composed of a head slider 46 and a suspension 41, which are formed in a similar manner as those of the first embodiment. Other features of this second embodiment similar to the first embodiment will not be described again. However, it should be noted that the index numbers of similar features have been increased by ten (10). Thus, for example, head slider 36 of the first embodiment becomes head slider 46 in the second embodiment.

One difference from the first embodiment is that the suspension 41 of the second embodiment is provided with a different type of head slider attaching portion 45D. The slider attaching portion 45D is planar in the longitudinal direction of the head slider 46, and is, when press-formed, punched into a planar plate extending in the longitudinal direction of the head slider 46. Similar to that of the first embodiment, the slider attaching portion 45D is formed with a generally U-shaped opening 45 around its perimeter, and is supported by beams 45A, 45B, and 45C.

In this embodiment, the center part of the securing surface 46T on the slider 46 includes curved surface 46B, which may be formed, for example, by cutting into the $Al_2O_3TiC$ substrate of the head slider 46. This curved surface 46B is preferably shaped like the outer circumference of a cylinder, and thus forms a semicylindrically projected wall extending in the longitudinal direction. Instead of the C-shaped curved surface (in cross-section shown, O-shaped, U-shaped or V-shaped cross-sections are also contemplated.

Since the curved surface 46B extends in the longitudinal direction, it comes into contact with the attaching portion 45D in a linear manner. Accordingly, the slider attaching portion 45D and the curved surface 46B form a surface contact therebetween, and not a point contact. In this regard, the head slider 46 should be firmly secured to the suspension 41 by means of an adhesive 42 coated fully (or at least partially) on the curved surface 46B and/or on the slider attaching portion 45D.

A read/write element 46A is provided on the side surface of the head slider 46 by means of thin film formation, for example, and the read/write element 46A includes a recording head section and a reading head section. As in the first embodiment, it is important for the stable recording and/or reading of signals that the read/write element 46A is maintained at the required distance from the recording film of the disk.

An enlarged view of FIG. 4(B) shows in particular the presence of torsion in the suspension 41. The curved surface 46B and the attaching portion 45D face each other when the head arm attaching surface 43 and the lower slider surface 46D are parallel to each other. However, due to the presence of twisting, the contact portion D between the curved surface 46B and the slider attaching portion 45D is not aligned with the center line C of the curved surface 46B. This fact means that if the curved surface 46B and the slider attaching portion 45D are brought into contact when the head arm attaching surface 43 and the lower slider surface 46D are in a parallel relationship, only the slider attaching portion 45D rotates in the direction of the arrow (following the arc of the curved surface 46B) and becomes misaligned. Because only the slider attaching portion 45D is twisted, the overall twisting stress of the suspension is reduced.

Figure 1B:
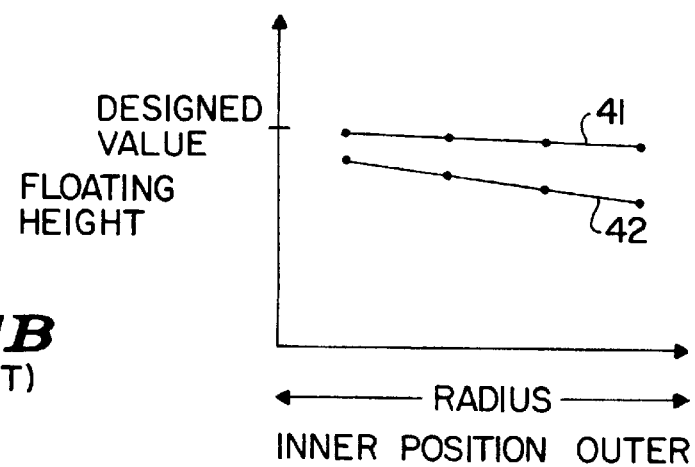
FIG. 1(B) shows a graph of the floating height of the head slider when positioned in different radial locations on the disk.

In the example shown in FIG. 4(B), the arrow indicating the twisting direction of the slider attaching portion 45D points in a clockwise direction. However, since the twisting rotation characteristic of the curved surface 35E may be different for each suspension, the arrow may point in a counterclockwise direction in other suspensions. The rotating amount thereof may also be varied in response to the degree of twisting stress. However, irrespective of the magnitude and direction of the twisting, and even if the contact portion D is not aligned with the center line C of the curved surface 46B, there is no longer the problem that the head slider 46 is fixed to the suspension 41 under the condition that head slider 46 is rotated in direction "a" or direction "b" (as shown in FIGS. 1(A) and 1(B)) because the twisting of the slider attaching portion 45D compensates for the misaligned between the contact portion D and the center line C.

When no twisting is present in the suspension, the contact portion D between the curved surface 46B and the slider attaching portion 45D is aligned with the center line C of the curved surface 46B, as long as the head arm attaching surface 43 and the lower slider surface 46D are parallel to each other. Thus, with or without twisting, it is possible to make the head arm attaching surface 43 and the lower slider surface 46D parallel. Similar benefits to those described with regard to the first embodiment are also realized with this embodiment.

Figure 5A:
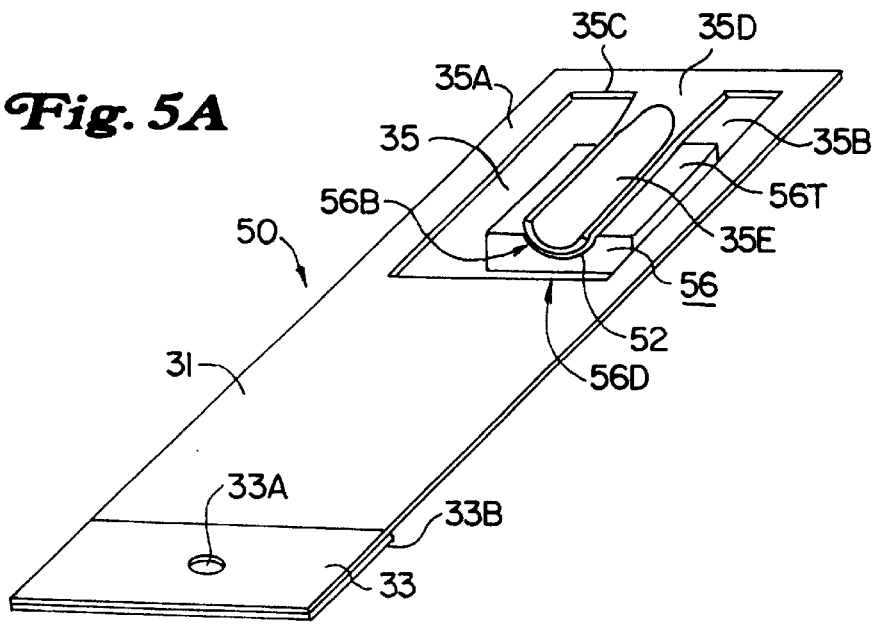
FIG. 5(A) shows a perspective view of the head assembly of the third embodiment of the present invention.
Figure 5B:
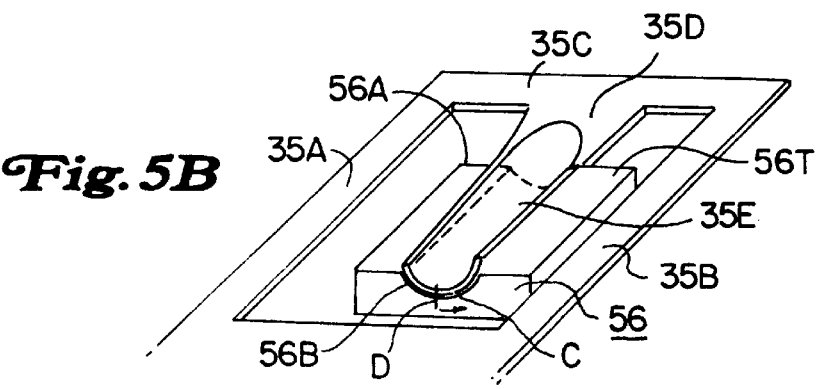
FIG. 5(B) shows an enlargement of part of FIG. 4(A)

FIG. 5(A) and FIG. 5(B) show a head assembly of a third embodiment of the invention. FIG. 5(A) shows the entire body of the head assembly, and FIG. 5(B) shows a partially enlarged view.

The same suspension 31 as shown in FIGS. 3(A) and 3(B) is used in the head assembly 50 of the third embodiment shown in FIGS. 5(A) and 5(B). As suspension 31 in FIGS. 5(A) and 5(B) is the same as suspension 31 in FIGS. 3(A) and 3(B), the same reference numerals will be used to describe like parts. Once again, suspension 31 is furnished with a head arm attaching surface 33 designed so that it is parallel to the disk surface, an attaching hole 33A, a spacer 33B, and a slider attaching portion 35D, which includes semicylindrically curved surface 35E.

As in FIGS. 3(A) and 3(B), the slider attaching surface 35D here in FIGS. 5(A) and 5(B) is also formed with a generally U-shaped opening 35 around its perimeter, and is supported by beams 35A, 35B, and 35C. The securing surface 56T (or suspension attaching surface) of the head slider 56 is different from those of FIGS. 3(A) and 3(B) and FIGS. 4(A) and 4(B). In this embodiment, the securing surface 56T includes a curved surface 56B, which may be formed, for example, by cutting away a portion of the $Al_2O_3TiC$ substrate from the rectangular head slider 56. The curved surface 56B is preferably the circumference (i.e., the inner circumference of a cylinder) of the semicylindrically depressed groove extending in the longitudinal direction. The curved surface 35E (which is preferably the outer circumference of a cylinder) may be placed within the curved surface 56B of the depressed groove of the securing surface 56T by making use of its elasticity to reduce its width by pressing its edges together lightly. It is then fitted within the curved surface 56B by releasing the pressing force on its edges. In this embodiment, the radii of curvature of the curved surfaces 35E and 56B are preferably set at the same value selected from range between, for example, 5 and 50 mm.

Since the curved surface 35E and the curved surface 56B preferably have the same radius of curvature (if the processing precision is high), both curved surfaces come into full contact, or nearly full contact, along their arcs. On the other hand, if the processing precision is not as high, at least two-point contact or linear two-line contact occurs, since the curved surface 35E and the curved surface 56B are shaped as, respectively, the outer and inner circumferences of a cylinder.

Of course, the suspension can adequately support the head slider by engaging in either the two-point contact or the two-line contact. But by providing full surface contact, as is the preferred case with the present embodiment, the supporting strength can be increased. Whether the full surface contact, the point contact of not less than two points or the line contact of not less than two lines is employed depends upon the processing precision of the curved surfaces 35E and 56B, as well as the engagement between them, and numerous options are available. However, since a larger contact area increases the adhesion surface so that it can be better secured by the adhesive, the supporting strength of the head slider and the suspension is improved by such a larger contact area. The head slider 36 can be firmly secured to the suspension 31 by using an adhesive that is fully coated on the curved surface 56B of the suspension 56. In addition to the features previously described, a read/write element 56A is also provided on the surface at the side of the head slider 56 by means of thin film forming techniques, as in the other embodiments.

The enlarged view of FIG. 5(B) shows in particular the presence of torsion in the suspension 31. The curved surface 35E and the curved surface 56B face each other when the head arm attaching surface 33 and the lower surface 56D are parallel. However, due to the presence of torsion, the contact portion D between the curved surface 35E and the curved surface 56B is not aligned with the center line C of the curved surface 35E. This means that if the curved surface 35E and the curved surface 56B are brought into contact when the head arm attaching surface 33 and the surface 56D of the head slider 56 facing the disk maintain a parallel relationship, only the curved surface 35E rotates in the direction of the arrow and becomes misaligned. With torsion primarily limited to the curved surface 35E only, the overall torsion stress of the suspension is reduced.

As in the other embodiments, the degree and direction of the twisting stress may vary from one suspension to another. However, even if the contact portion D is not aligned with the center line C of the curved surface 35E, since the head arm attaching surface 33 and the lower slider surface 56D are maintained in a parallel relationship to each other, there is no longer the problem that the head slider 56 is fixed to the suspension 31 so that it is rotated in direction "a" or direction "b".

When no torsion is present in the suspension, the contact portion D between the curved surface 35E and the curved surface 56B is aligned with the center line C of the curved surface 35E when the head arm attaching surface 33 and the surface 56D of the head slider 56 facing the disk are parallel.

Figure 5C:
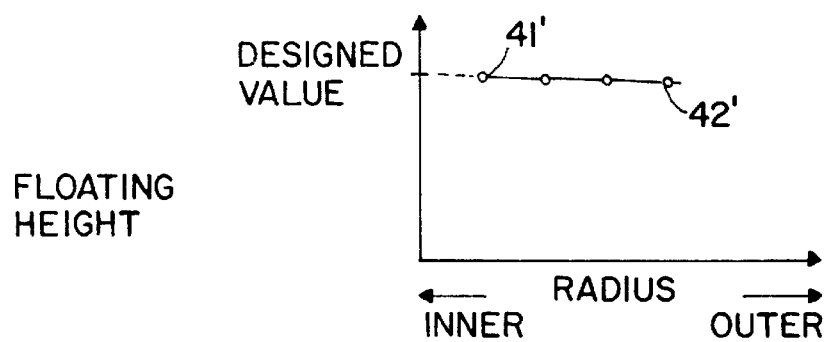
FIG. 5(C) shows a graph of the floating height of the head slider at different radial portions on the disk.

For the above mentioned structure, FIG. 5(C) shows the floating height of the head slider in the direction of the radius of the disk. Data line 41' shows the case of no torsion in the suspension, and shows that it has a constant head slider floating height from the inner side to the outer side of the disk, and that the head slider floats at the predetermined designed value, irrespective of its position on the disk. Data line 42' shows the case of employing the current embodiment, with torsion present in the suspension, and it shows that the floating height is constant from the inner to the outer sides of the disk. That is, from this graph which shows that data line 41' coincides with data line 42', it is apparent that any effects of torsion on the suspension does not affect the floating height of the head slider of the present invention. It is therefore possible to have the lower slider surface 56D positioned parallel to the disk surface, and subsequently the read/write element 56A can be maintained at a fixed distance from the recording film of the disk. Thus, if such a disk assembly 50 is applied to the disk device of FIG. 2, it is possible to maintain a constant head slider floating height above the disk at both the inner and outer sides thereof. Accordingly, the recording and reading efficiency, durability, and reliability of the disk device can be improved by decreasing the frequency of contacts between the disk and the head slider.

Figure 6A:
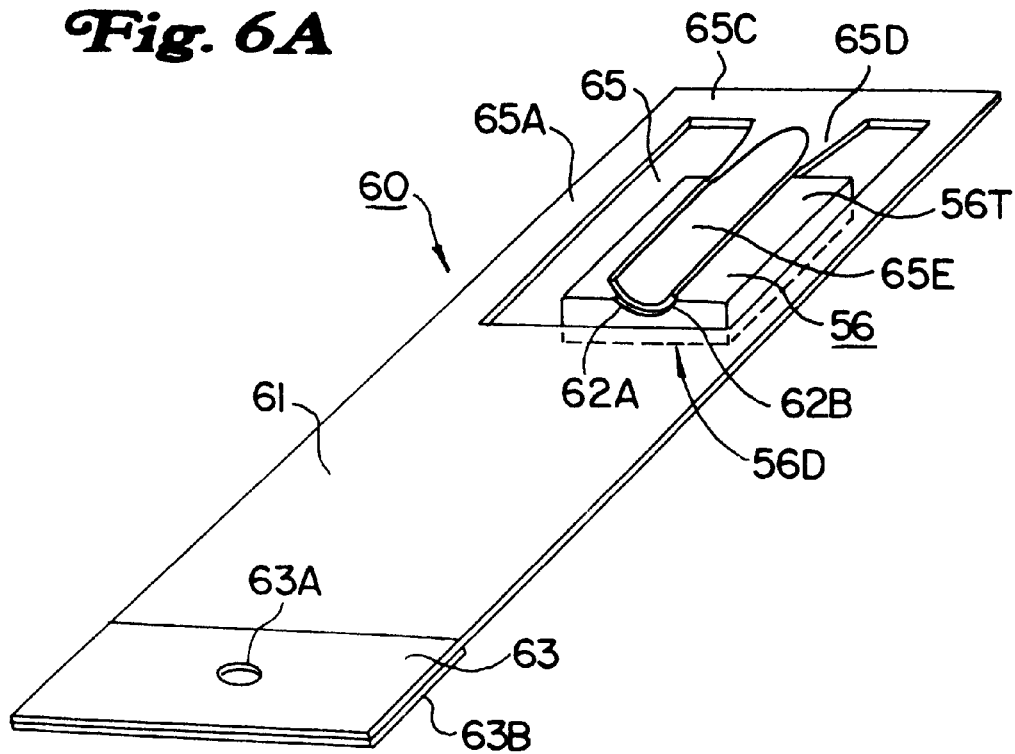
FIG. 6(A) shows a perspective view of the head assembly of the fourth embodiment of the present invention.
Figure 6B:
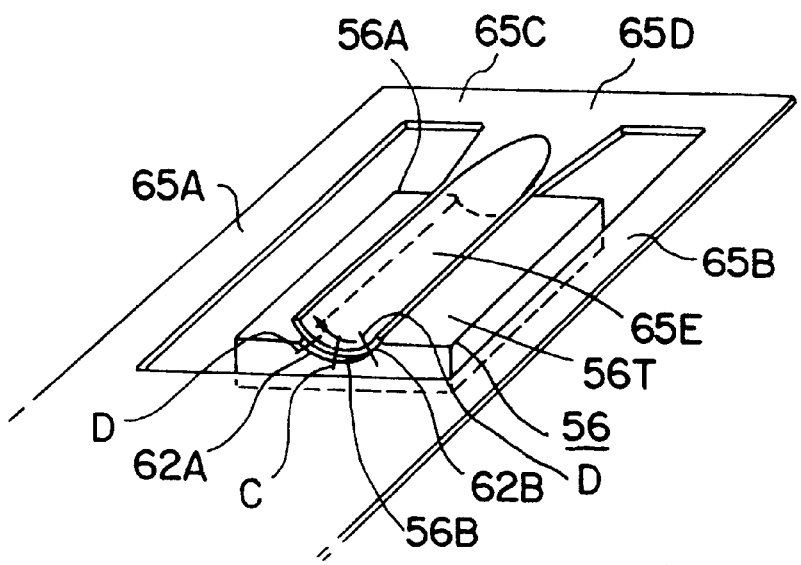
FIG. 6(B) shows an enlargement of part of FIG. 6(A);.

FIG. 6(A) and FIG. 6(B) show a head assembly of a fourth embodiment of the invention. FIG. 6(A) shows the entire body of the head assembly, and FIG. 6(B) shows a partially enlarged view. In the head assembly 60 shown, the same head slider 56 as that shown in FIGS. 5(A) and 5(B) is used. The main difference between this embodiment and the third embodiment is that here, this embodiment includes changes in the radius of curvature of the curved surfaces 56B and 65E, whereas in the third embodiment, both curved surfaces had the same radius of curvature. FIGS. 6(A)–6(B) show an example in which the radius of curvature of the curved surface 65E is made larger than that of the curved surface 56B. However, functionally, either of the radii of curvature may be made to be larger than the other. In the present embodiment, the radius of curvature is preferably selected from the range between 5 and 50 mm, depending upon the size of the head slider.

Similar to the other embodiments, the suspension 61 is furnished with a head arm attaching surface 63 designed so that it is parallel to the disk surface, an attaching hole 63A, a spacer 63B, and a slider attaching portion 65D for attaching a head slider 56. The slider attaching portion 65D extends in the longitudinal direction of the head slider 56, and is, when press-formed, processed by R-bending so that it creates a semicylindrically curved surface 65E (i.e., a cylindrical outer circumference).

As in the other embodiments, the slider attaching portion 65D is formed with a generally U-shaped opening 65 around its perimeter, and it is supported with beams 65A, 65B and 65C. The secured surface 56T (i.e., the suspension attaching surface) of the head slider 56 is different from those of FIGS. 3(A)–3(B) and FIGS. 4(A)–4(B). The head slider 56 is formed such that its securing surface 56T includes a curved surface 56B, which is preferably formed by cutting into the Al2O3TiC substrate of the rectangular head slider 46. The curved surface 56B is preferably shaped like the inner circumference of a cylinder, and forms a semicylindrically depressed groove extending in the longitudinal direction.

Thus, the curved surface 65E (which is shaped as the outer circumference of a cylinder) of the suspension 61 is inserted within the curved surface 56B of the depressed groove of the secured surface 56T of the head slider 56 by making use of its elasticity to reduce its width by pressing its edges together lightly. It is then fitted within the curved surface 56B by releasing the pressing force on its edges. Since the curved surface 65E and the curved surface 56B have different radii of curvature, both make at least two-point contact on both sides at the end points. Furthermore, since the curved surface 65E and the curved surface 56B are the outer and inner circumferences of a cylinder and extend in the longitudinal direction at almost a constant radius of curvature, they make linear two-line contact starting at two points on both sides of the ends of the curved surfaces 65E and 56B. Of course, the suspension can adequately support the head slider by engaging in two-point contact. However, by providing the two-line contact as preferred in the present embodiment, the supporting strength can be increased. Although not shown, if the curved surface 65E is further pushed into the curved surface 56B, the curved surface 65E can be brought into contact with the center of the curved surface 56B, and the area coming into contact can be enlarged by making three-point contact or three-line contact.

The head slider 56 can be firmly secured to the suspension 61 by full or partial coatings of adhesive 62A, 62B on the curved surface 56B. The cross-sections of the curved surfaces 65E and 56B may be U-shaped or V-shaped, and need not be C-shaped as shown. If the suspension and the head slider are U-shaped or V-shaped, or a combination thereof, and the suspension and the head have the same opening angle, an exact engagement between these two components may be made, which may result in the elimination of the ability of the suspension to shift in order to moderate torsion. However, if the opening angle of the suspension is made larger than that of the head slider, the same effect as this embodiment can be provided.

In addition to the other features described, a read/write element 56A is also provided on the side surface of the head slider 56 by means of, for example, a thin film forming technique. The read/write element 56A has a recording head section and a reading head section. It is important for stable recording and/or reading of signals that the read/write element 56A maintains the required distance from the recording film of the disk.

The enlarged view of FIG. 6(B) shows in particular the presence of torsion in the suspension 61. The curved surfaces 65E and 56B face each other when the head arm attaching surface 63 and the lower slider surface 56D are parallel. However, due to the presence of twisting, the contact portions D between the curved surface 65E and the curved surface 56B is not aligned with the center line C of the curved surface 65E. This means that if the curved surface 65E and the curved surface 56B are brought into contact when the head arm attaching surface 63 and the lower slider surface 56D are maintained in a parallel relationship, only the curved surface 65E rotates in the direction of the arrow and becomes misaligned. Because substantially only the curved surface 65E is twisted, the overall twisting stress of the suspension is reduced. As in the other embodiments, the degree and direction of twisting may vary from one suspension to another. However, with the present invention, it is possible to use the curved surfaces 65E to mitigate the effects of the twisting, and subsequently the read/write element 56A can be maintained at a fixed distance from the recording film of the disk.

Thus, if such a disk assembly 60 is utilized in the disk device of FIG. 2, it is possible to maintain a constant head slider floating height above both the radial inner and the radial outer sides of the disk. Accordingly, the recording and reading efficiency, durability, and reliability of the disk device may be improved by decreasing the frequency of contacts between the head slider and the disk.

Figure 7A:
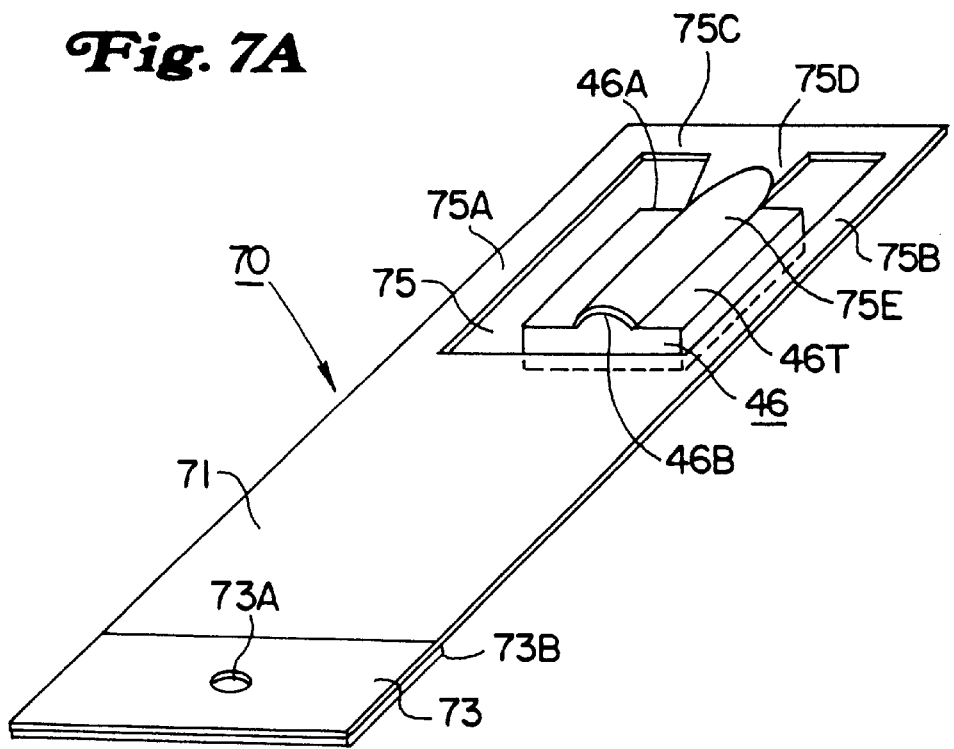
FIG. 7(A) shows a perspective view of the head assembly of the fifth embodiment of the present invention.
Figure 7B:
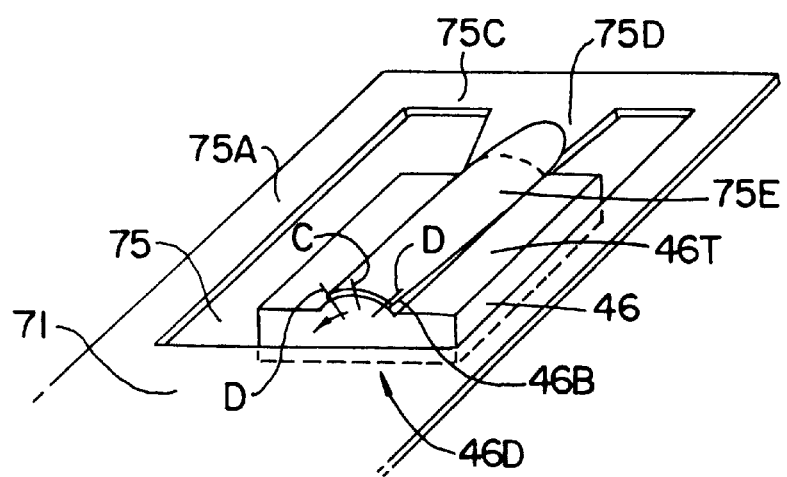
FIG. 7(B) shows an enlargement of part of FIG. 7(A)

FIG. 7(A) and FIG. 7(B) show a head assembly of a fifth embodiment of the invention. FIG. 7(A) shows the entire body of the head assembly, and FIG. 7(B) shows a partially enlarged view. In this embodiment, the same head slider (slider 46) shown in FIGS. 4(A) and 4(B) is used in head assembly 70, with like numbers designating like parts. Similar to the suspension of the other embodiments, the suspension 71 of this embodiment is furnished with a head arm attaching surface 73 designed so that it is parallel to the disk surface, an attaching hole 73A, a spacer 73B and a slider attaching portion 75D. The slider attaching portion 75D extends in the longitudinal direction of the head slider 46, and is, when press-formed, processed by R-bending so that it includes a semicylindrically curved surface 75E generally shaped as a cylindrical outer circumference. The slider attaching portion 75D is formed with a generally U-shaped opening 75 around its perimeter, and is supported by beams 75A, 75B and 75C.

The secured surface 46T of the head slider 46 is formed with a curved surface 46B, preferably formed by cutting into the $Al_2O_3TiC$ substrate of the rectangular head slider 46. This curved surface 46B is formed on the opposite surface from that which faces the disk, and curved surface 46B may be formed along with any slider rails included on the disk facing surface of the slider. The curved surface 46B is generally shaped as the outer circumference of a cylinder, and thus creates a semicylindrically depressed groove extending in the longitudinal direction. The curved surface 75E is generally shaped as the inner circumference of the cylinder. In this embodiment, the radius of curvature of the curved surfaces 75E and 46B are designed so that they are the same. The radius of curvature is preferably selected from the range of between 5 and 50 mm, depending upon the size of the head slider. Since the curved surface 75E and the curved surface 46B have the same radius of curvature (if the processing precision is high) both curved surfaces come into full contact along their arcs.

If the processing precision is not as high, since the curved surface 75E and the curved surface 46B comprise the inner or outer circumferences of a cylinder, the curved surface 75E meets the curved surface 46B as an enclosure. Thus, at least two-point contact or at least linear two-line contact is created between of the curved surface 75E and the curved surface 46B. Of course, the suspension can support the head slider by engaging in two-point or two-line contact, but by providing full surface contact as preferred in the present embodiment, the supporting strength can be further increased. Whether full surface contact, point contact of not less than two points or line contact of not less than two lines is employed depends upon the processing precision of the curved surfaces 75E and 46B, as well as the engagement between them, and various other options. However, since a larger contact area increases the adhesion surface being secured by the adhesive, the supporting strength of the head slider and the suspension can be improved by increasing the contact area. The head slider 46 can be firmly secured to the suspension 71 by the adhesive 72 by being coated fully or partially on the curved surface 46B of the suspension 46. In addition to the other features, a read/write element 46A is also provided on the surface at the side of the head slider 56, preferably by means of the thin film forming art.

An enlarged view of FIG. 7(B) shows in particular the presence of torsion in the suspension 71. The curved surface 75E and the curved surface 46B face each other when the head arm attaching surface 73 and the lower slider surface 46D are parallel. However, due to the presence of torsion, the contacting portion D between the curved surface 75E and the curved surface 46B may not be aligned with the center line C of the curved surface 75E. This means that if the curved surfaces 75E and 46B are brought into contact when the head arm attaching surface 73 and the lower slider surface 46D are maintained in a parallel relationship, only the curved surface 75E rotates in the direction of the arrow and becomes misaligned. Thus, because the torsion is contained in the curved surface 75E only, the overall torsion stress of the suspension is reduced. As in the other embodiments, torsion stress of different directions and magnitudes than that shown may also occur in different suspensions.

However, regardless of the magnitude and direction of the torsion stress, even if the contacting portion D is not aligned with the center line C of the curved surface 75E, since the head arm attaching surface 73 and the lower slider surface 46D are maintained in a parallel relationship, there is no longer the problem that the head slider 46 is fixed to the suspension 71 such that it is rotated in direction "a" or direction "b".

When no torsion is present in the suspension, the contact portion D between the curved surface 75E and the secured surface 46B is aligned with the center line C of the curved surface 75E when the head arm attaching surface 73 and the lower slider surface 46D are parallel. It is therefore possible for the lower slider surface 46D to be maintained parallel to the disk surface, and subsequently for the read/write element 46A to be maintained at a fixed distance from the recording film of the disk. Thus, by including assembly 70 in the disk device of FIG. 2, a constant floating height may be maintained from the radial inner portion to the radial outer portion of the disk. It is therefore possible to improve the recording and reading efficiency, durability, and reliability of the disk device by reducing the frequency of contacts between the head slider and the disk.

Figure 8A:
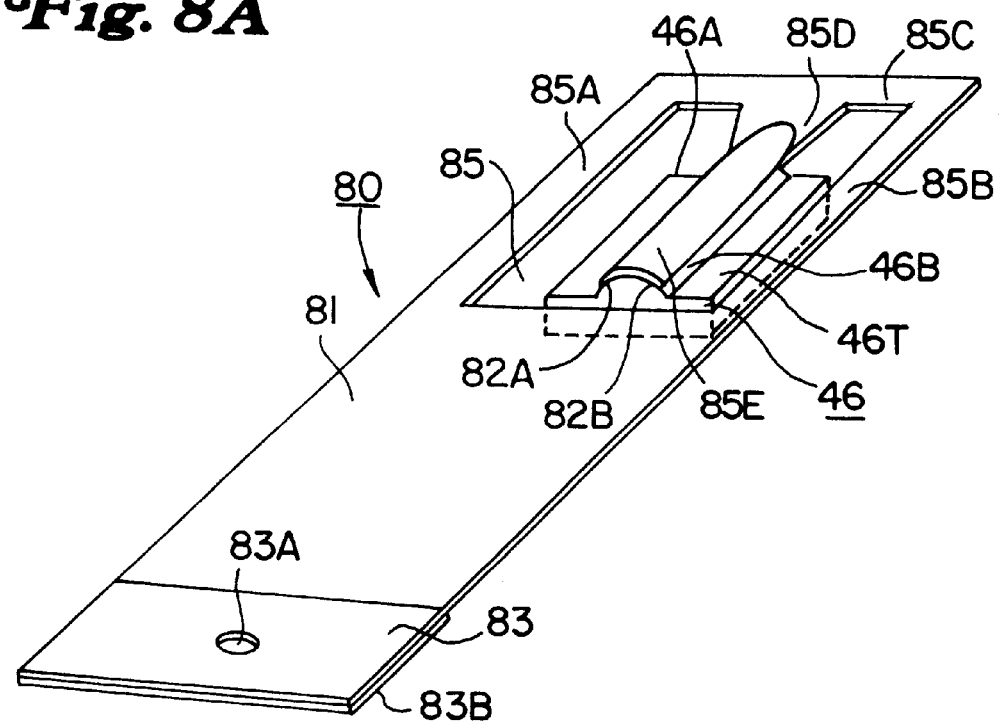
FIG. 8(A) shows a perspective view of the head assembly of the sixth embodiment of the present invention.
Figure 8B:
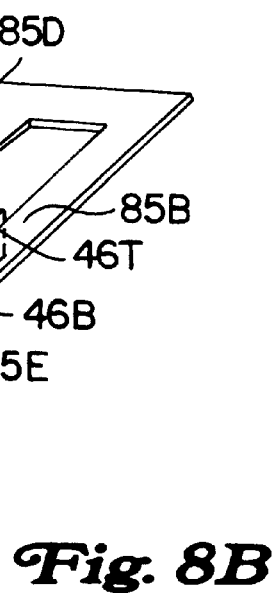
FIG. 8(B) shows an enlargement of part of FIG. 8(A)

FIG. 8(A) and FIG. 8(B) show the head assembly of a sixth embodiment of the invention. FIG. 8(A) is the entire body of the head assembly, and FIG. 8(B) shows a partially enlarged view. In head assembly 80 of this embodiment, the same head slider 46 as shown in FIGS. 4(A) through 4(B) is used, and therefor a detailed explanation of the slider will be omitted.

One difference between this embodiment and the fifth embodiment is that in this embodiment the suspension 81 includes a curved surface 85E with a radius of curvature that is different from that of the curved surface 46B. Functionally, either radius of curvature may be made larger than the other one, and FIGS. 8(A) and 8(B) show an example in which the radius of curvature of the curved surface 45E is made larger than that of the curved surface 85E. In the present embodiment, the radius of curvature is preferably selected from the range of between 5 and 50 mm, depending upon the size of the head slider.

As in the other embodiments, the suspension 81 is furnished with a head arm attaching surface 83 designed so that it is parallel to the disk surface, an attaching hole 83A, a spacer 83B and a slider attaching portion 85D. The slider attaching portion 85D extends in the longitudinal direction of the head slider 46, and is, when press-formed, processed by R-bending to form a semicylindrically curved surface 85, which is generally in the shape of a cylindrical outer circumference 85E. The slider attaching portion 85D is formed with a generally U-shaped opening 85 around its perimeter, and is supported by beams 85A, 85B and 85C.

Since the curved surface 85E and the curved surface 46B have different radius of curvature, there is at least two-point contact or linear two-line contact between the curved surface 85E and the curved surface 46B. Of course, the suspension can support the head slider by engaging in two-point contact, but by providing two-line contact as preferred in the present embodiment, the supporting strength can be further increased. Although not shown in the drawing, if the curved surface 85E is further pushed onto the curved surface 46B, the curved surface 85E can be brought into contact with the center of the curved surface 46B, and the total contact area can be enlarged by making three-point contact or three-line contact.

The head slider 46 can be firmly secured to the suspension 81 by adhesive 82A, 82B which may be coated on both edges of the two parts being connected. A read/write element 46A is provided on the side surface of the head slider 46, preferably by means of a thin film forming technique, and the read/write element 46A has a recording head section and a reading head section. For stable recording and or reading of signals, the read/write element 46A must maintain the required distance from the recording film of the disk.

The enlarged view of FIG. 8(B) shows in particular the presence of torsion in the suspension 81. The curved surface 85E and the curved surface 46B face each other when the head arm attaching surface 83 and the lower slider surface 46D are parallel. However, due to the presence of torsion, the contact portion D between the curved surface 85E and the curved surface 46B is not aligned with the center line C of the curved surface 85E. This means that if the curved surface 85E and the curved surface 46B are brought into contact when the head arm attaching surface 83 and the lower slider surface 46D are maintained in a parallel relationship, only the curved surface 75E rotates in the direction of the arrow and becomes misaligned. Thus, with the torsion being primarily limited to the curved surface 85E only, the overall torsion of the suspension is reduced. As in the other embodiments, the magnitude and direction of the torsion stress may vary in different suspension units. However, as also with the other embodiments, the same problem related to misaligned sliders is solved, resulting in the same benefits discussed earlier.

The cross sections of the curved surfaces 85E and 46B may be U-shaped or V-shaped, and need not be C-shaped, as shown in the embodiment of FIGS. 8(A) through 8(B). If the suspension and the head slider are U-shaped or V-shaped, or a combination thereof, and the suspension and the head have the same opening angle, exact engagement is made between them and the suspension is not moved for moderating torsion. However, if the opening angle of the suspension is made larger than that of the head slider, the same effect as this embodiment can be achieved.

Figure 9A:
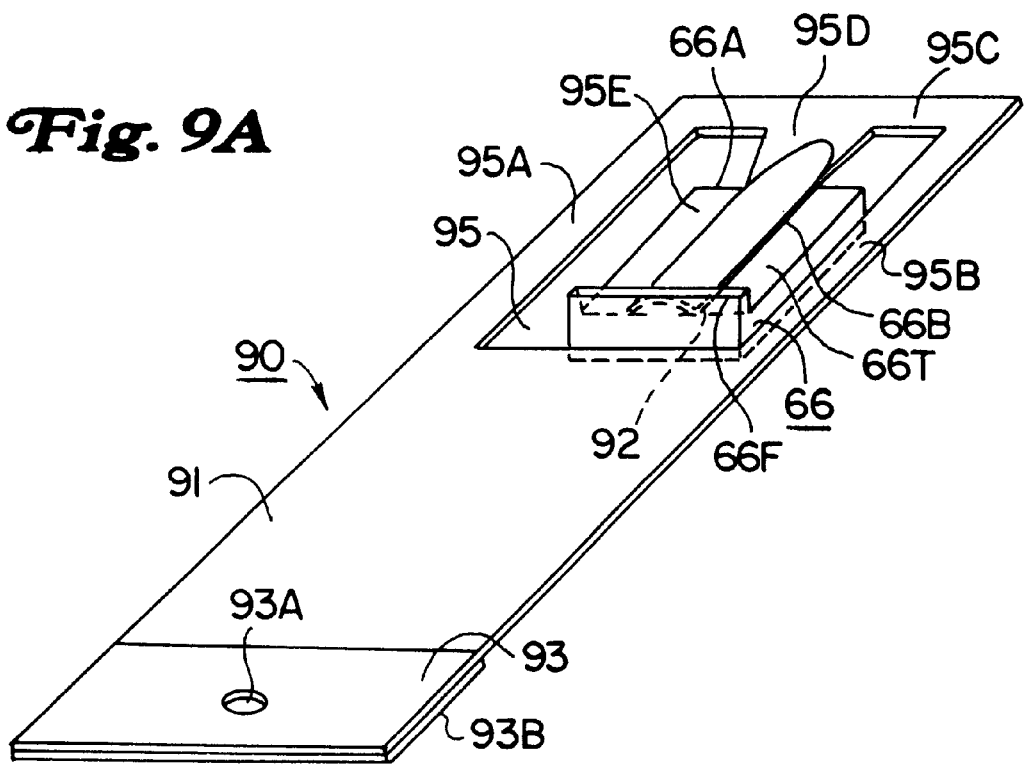
FIG. 9(A) shows a perspective view of the head assembly of the seventh embodiment of the present invention.
Figure 9B:
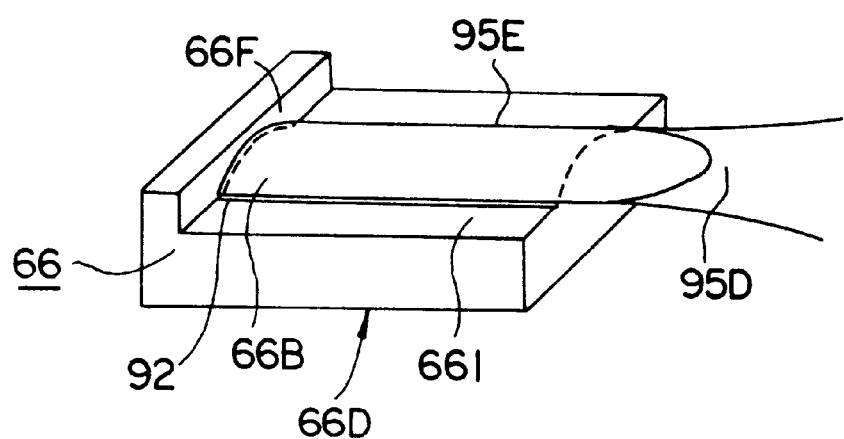
FIG. 9(B) shows an enlargement of part of FIG. 8(A)

FIG. 9(A) and FIG. 9(B) show the head assembly of a seventh embodiment of the invention. FIG. 9(A) shows the entire body of the head assembly, and FIG. 9(B) shows a partially enlarged view. In this embodiment, the same suspension as that shown in FIGS. 7(A) and 7(B) (and designated as suspension 71) has been designated as suspension 91 in a head assembly 90 in this embodiment. The suspension 91 is furnished with a head arm attaching surface 93 designed so that it is parallel to the disk surface, an attaching hole 93A, a spacer 93B, and a slider attaching portion 95D at an opposite side for attaching a head slider 66.

The slider attaching portion 95D is shaped so that it extends in the longitudinal direction of the head slider 66, and is, when press-formed, processed by R-bending so that it includes a curved surface 95E (shaped as the inner circumference of cylinder), which forms a semicylindrically depressed groove extending in the longitudinal direction. The slider attaching portion 95D is formed with a generally U-shaped opening 95 around its perimeter, and is supported by beams 95A, 95B and 95C.

One important feature of this embodiment is that the securing surface 66T of the head slider 66 is formed with a step 66F at one end thereof that is higher than the curved surface 66B. This step 66F serves as a positioning side wall to position the slider attaching portion 95D. The curved surface 66B is preferably shaped as the outer circumference of the cylinder, or as the outer circumference of a semicolumn. The curved surface 95E is generally shaped as inner circumference of a cylinder.

Similar to the embodiment shown in FIGS. 7(A) and 7(B), the curved surfaces 95E and 66B are designed to have the same radius of curvature, but if varied as in the embodiment of FIGS. 8(A) and 8(B), the function is the same. In the present embodiment, the radius of curvature is preferably selected from the range of between 5 and 50 mm, depending upon the size of the head slider. If the curved surface 95E and the curved surface 66B have the same radius of curvature (if the processing precision is high), both curved surfaces come into full contact along their arcs. If the processing precision is not as high, or if both radii of curvature are intended to be different as in the embodiment of FIGS. 8(A)–8(B), the curved surface 95E meets the curved surface 66B by enclosing it, and there is at least two-point contact or linear two-line contact between these two parts. Of course, the suspension can support the head slider by engaging in either two-point contact or two-line contact, but by providing full surface contact as preferred in the present embodiment, the supporting strength can be further increased. Whether the full surface contact, the point contact of not less than two points, or the line contact of not less than two lines is employed depends on the processing precision of the curved surface 95E and the curved surface 66B, and the engagement between them, and various options are available. However, since a larger contact area increases the adhesion surface secured by the adhesive, the supporting strength of the head slider and the suspension may be improved by increasing the contact area.

The head slider 66 can be firmly secured to the suspension 91 by adhesive 92 which is coated fully or partially on the curved surface 66B of the suspension 96. In the current embodiment, in addition to the effect of the suspension on torsion similar to that found in the suspensions shown in FIGS. 7(A)–7(B) and 8(A)–8(B), it is also possible to improve the positioning precision in the longitudinal direction (backwards and forwards) of the head slider 66 of the slider attaching surface 95D by providing a positioning wall surface such as the step 66F. With such a positioning wall surface, is therefore easy to mass produce suspension assemblies with the head slider mounted uniformly on the suspension. Accordingly, if suspensions of uniform precision are employed in the disk device shown in FIG. 2, it is possible to enhance the precision and the reliability of the disk device.

Figure 10A:
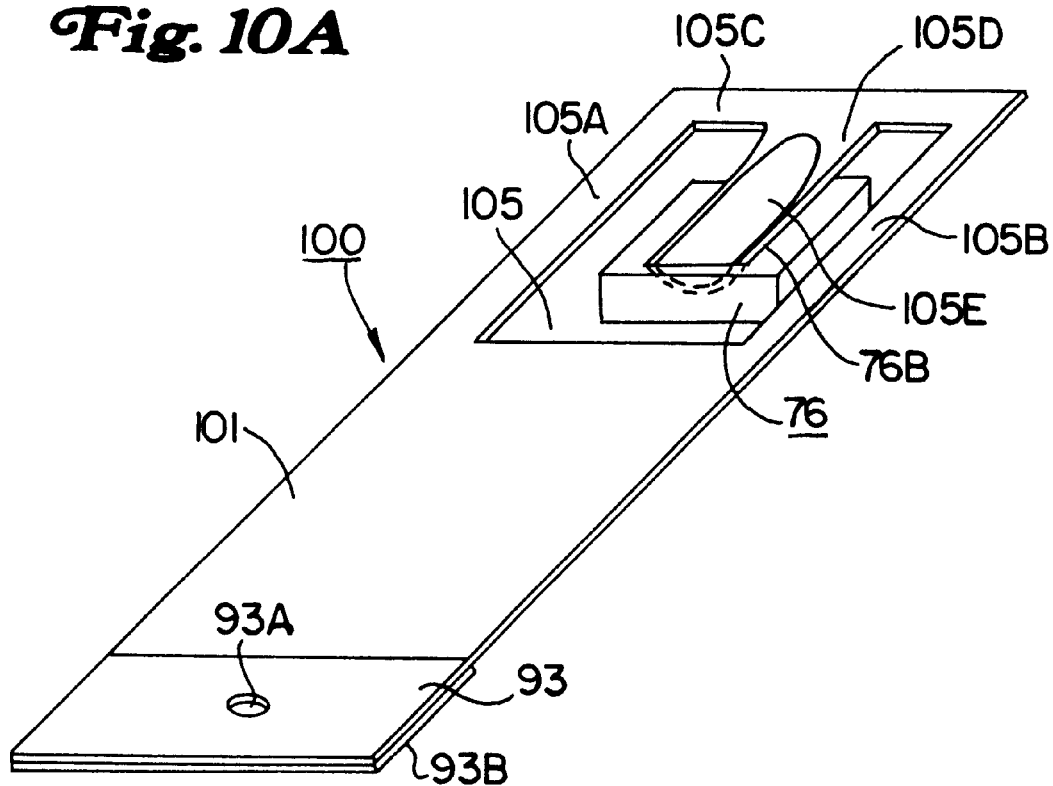
FIG. 10(A) shows a perspective view of the head assembly of the eighth embodiment of the present invention.
Figure 10B:
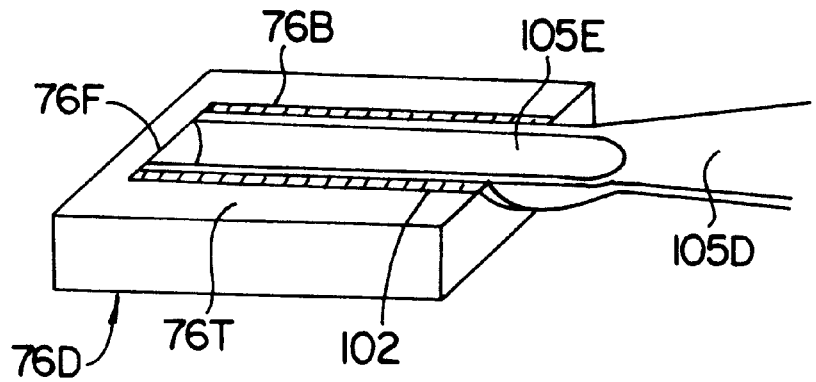
FIG. 10(B) shows an enlargement of part of FIG. 10(A)

FIG. 10(A) and FIG. 10(B) show the head assembly of an eighth embodiment of the invention. FIG. 10(A) shows the entire body of the head assembly, and FIG. 10(B) shows a partially enlarged view. In this embodiment, the same suspension (designated as suspension 31) as shown in FIGS. 5(A) and 5(B) is used here and has been designated as suspension 101 in head assembly 100. The suspension 101 is furnished with a head arm attaching surface 103 designed so that it is parallel to the disk surface, an attaching hole 93A, a spacer 93B, and a slider attaching portion 105D. The slider attaching portion 105D is shaped to extend in the longitudinal direction of the head slider 76, and is, when press-formed, processed by R-bending so that it includes a curved surface 105E (generally shaped as the outer circumference of the cylinder), which is the of the semicylinder extending in the longitudinal direction of the head slider 76. The slider attaching portion 105D is formed with a generally U-shaped opening 105 around its perimeter, and is supported by three beams 105A, 105B and 105C. In addition to the curved surface 76B of the depressed groove formed by cutting a semicylinder into the slider (similar to that of the embodiment of FIGS. 5(A)–5(B)), the securing surface (the suspension attaching surface) 76T of this embodiment is also provided with a positioning wall surface 76F, located where the curved surface 105F strikes against the end of the curved surface 76B. The curved surface 105E of the suspension 101 is placed within the curved surface 76B of the depressed groove of the secured surface 76T of the head slider 76 by making use of its elasticity to reduce its width by pressing lightly. It is then fitted within the curved surface 76B by releasing the pressing force on its edges.

Similar to the embodiment of FIGS. 5(A) and 5(B), the curved surfaces 105E and 76B are designed to have the same radius of curvature. However, it is also contemplated that each radii may be different as in the embodiment of FIGS. 6(A) and 6(B). In the present embodiment, the radius of curvature is preferably selected from the range of between 5 and 50 mm, depending upon the size of the head slider. Since the curved surface 105E and the curved surface 76B have the same radius of curvature, if the processing precision is high, both curved surfaces come into full contact along their arcs. On the other hand, if the processing precision is not too high, or if both radii of curvature are intended to be different as in the embodiment FIGS. 6(A) and 6(B), the curved surface 105E may make at least two-point contact or linear two-line contact. Of course, the suspension can support the head slider by engaging in either two-point contact or two-line contact, but by providing full surface contact as preferred in the present embodiment, the supporting strength can be further increased. Whether full surface contact, point contact of not less than two points, or line contact of not less than two lines is employed depends on the processing precision of the curved surface 105E and the curved surface 76B, and the engagement between them, and various options are available. However, since a larger contact area increases the adhesion surface so that it can be secured by the adhesive, the supporting strength of the head slider and the suspension are improved with an increase in the central area.

The head slider 76 can be firmly secured to the suspension 101 by an adhesive coated fully or partially on the curved surface 76B of the suspension 76. The adhesive may also be coated upon the curved surface 105E of the slider, either in addition to the adhesive coated upon the suspension 76 or instead of that adhesive. In the current embodiment, in addition to mitigating the effects of torsion as in the embodiments of FIGS. 5(A), and 5(B) and 6(A) and 6(B), it is also possible to improve the positioning precision in the longitudinal direction of the head slider 76 providing the positioning wall surface 76F. It is therefore easy to mass produce suspension assemblies with the head sliders mounted uniformly on the suspension. Accordingly, if a suspension of uniform precision is employed in the disk device of FIG. 2, it is possible to enhance the precision and reliability of the disk device.

The assembly which utilizes the head assemblies of embodiments 1 to 8 and the technology of this invention may also employ a suspension in which signal wiring for exchanging signals with the head element parts of the head slider is patterned by utilizing thin film forming technique (spattering, vacuum vaporization, plasma CVD etc.). The wire pattern is formed on the surface of the suspension on the side where the head slider is mounted, and extends along the beams of the suspension in the vicinity of the head slider mounting portion The wire pattern is positioned such that the terminal of the wire pattern vertically faces the terminal of the head element. The terminals of the wiring pattern and of the head element are preferably connected by a ball bonding technique in which materials with good heat conductivity (such as gold or copper) are shaped into balls and brought into surface contact with the terminals of both the wire pattern and the head element. The terminal surface of the suspension is preferably formed so that it is flat with no curved surfaces, depressions, or protrusions, to facilitate the ball bonding process. The terminal of the head slider is also preferably formed at a position that lacks projections or depressions to also facilitate ball process. If the curvature or opening angle of the projection or depression is made large, the ball bonding can be easily done.

Figure 11A:
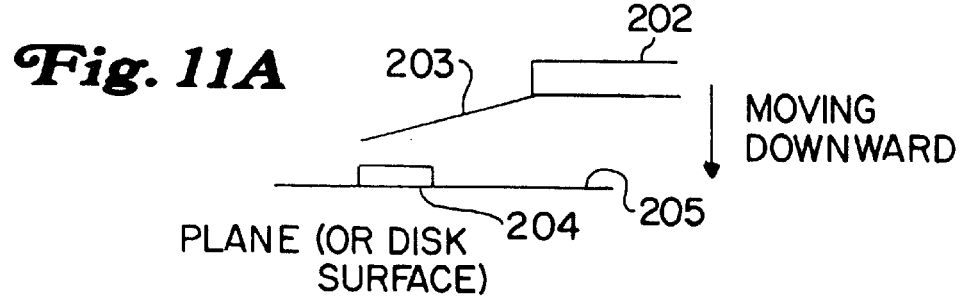
FIGS. 11(A) through 11(D) show views of the steps of the adhesion procedure of the head slider of the first embodiment.

FIGS. 11(A) to (D) show a first embodiment of a procedure for assembling the suspension and the head slider together. As shown in FIG. 11(A), suspension 203 is held by a suspension holding arm 202 such that the arm attaching portion is parallel to a disk or other planar surface 205. First, the head slider 204 is placed on a service plate of the disk/planar surface 205. Before the head slider 204 is placed upon the disk/planar surface 205, the left/right alignment of the suspension and head slider are determined so that the slider is properly centered with respect to the sides of the suspension.

Figure 11B:
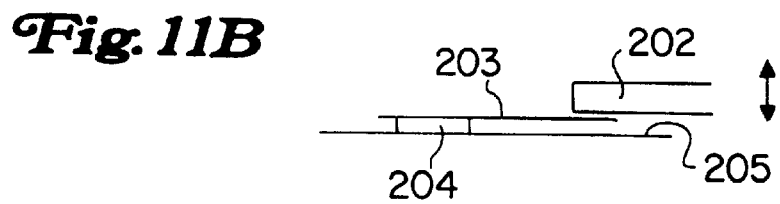
Figure 11C:
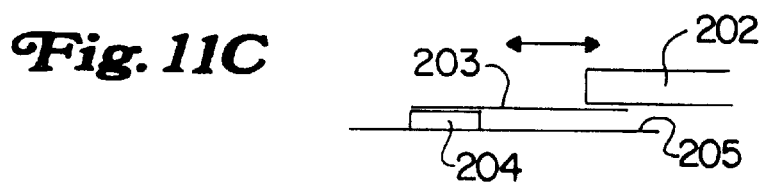
Figure 11D:
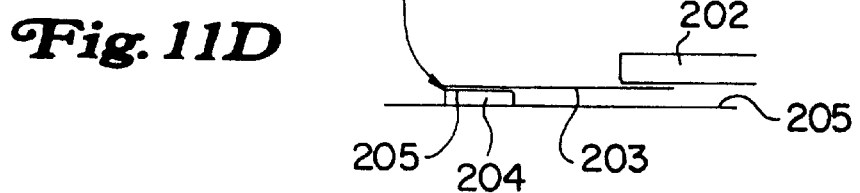

When the suspension holding arm 202 moves down (as shown by the arrow in FIG. 11(A)), the suspension 203 is brought closer to the head slider 204. In FIG. 11(B), the height of the suspension 203 is adjusted with respect to the head slider 204. This procedure requires careful attention so that the suspension 203 does not strike against the head slider 204 with too much force, causing deformation due to its elasticity. During this step, the arm is moved up or down until a predetermined mounting height has been reached. In FIG. 11(C), the longitudinal position of the suspension 203 with respect to the head slider 204 is adjusted. The slider attaching surface of the suspension faces the suspension attaching surface of the head slider. After the suspension 203 and the head slider 204 have been properly positioned, the adhesive is applied between the two components, as shown by the arrow in FIG. 11(D).

By positioning the suspension and the head slider as described, the arm attaching surface of the suspension and the lower slider surface may be maintained in a parallel relationship. If the suspension and the head slider are secured with an adhesive while maintaining the above parallel condition, the arm attaching surface of the suspension and the lower slider surface will be maintained in the desired parallel condition. The assembled head slider and suspension combination may thus be mounted into a disk device, such as that shown in FIG. 2.

In the example attachment procedure shown in FIGS. 11(A) through 11(D), the suspensions are attached one by one. However, it is also possible to attach multiple suspensions and multiple head sliders together at the same time when the suspensions are held together in a press sheet. After assembly, the suspensions are separated from the press sheet. Thus, many head sliders can be adhered to the suspensions at the same time, and the production efficiency of the head assembly is increased.

Figure 12A:
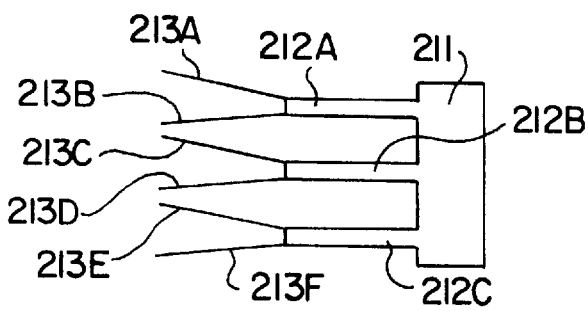
FIGS. 12(A) through 12(E) show views of steps of the adhesion procedure of the head slider of the second embodiment.
Figure 12B:
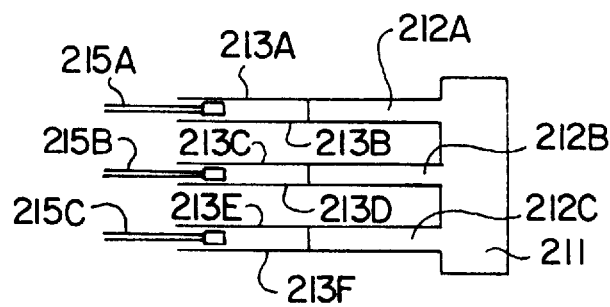
Figure 12C:
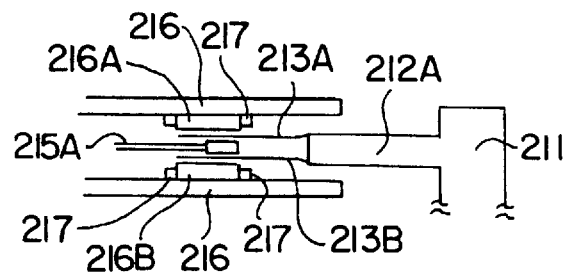
Figure 12D:
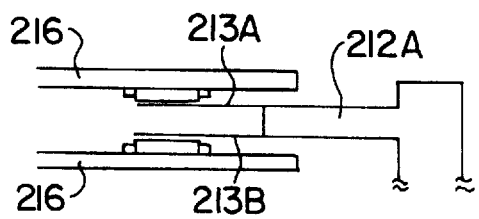
Figure 12E:
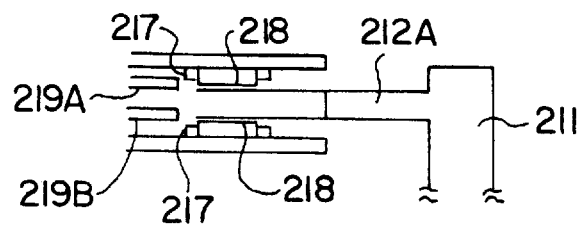

FIGS. 12(A) through (12E) show a second embodiment procedure for assembling the suspension and the head slider together. This embodiment shows the adhesion of suspensions 213A through 213F to a series of head sliders. As shown in FIG. 12(A), multiple suspensions 213A through 213F are attached to multiple arms 212A through 212C, whereby each arm supports two suspensions. The arms 212A through 212C are mounted on carriage 211. As shown in FIG. 12(B), when multiple suspensions 213A through 213F are moved onto their associated head sliders, the opposed surfaces of each pair of suspensions (213A/213B, 213C/213D, 213E/213F) are held by vacuum nozzles 215A through 215C so they do not touch the head slider and service plate. FIG. 12(C) shows head sliders 216A and 216B placed on service plates 216 to face respectively, suspensions 213A and 213B. The head sliders 216A and 216B are firmly held on their associated service plate 216 by means of a set of holders 217. In FIG. 12(D), the service plate 216 is moved to carry out positioning in the longitudinal direction of the suspensions, as well as in the right and left directions. Once the sliders are properly positioned, the vacuum nozzles 215A and 215B are released, and the head sliders 216A and 216B are mounted onto the suspensions 213A and 213B. As shown in FIG. 12(E), nozzles 219A and 219B are used to apply an adhesive 218 onto the connecting parts of the head slider and the suspension. Once each head slider is secured to its associated suspension, holders 217 are removed, and the service plates 216 are withdrawn. The same procedure is applied to the other suspensions 213C through 213F. By positioning the suspension and the head slider in this manner, the arm attaching surface of the suspension and the lower slider surface may be kept parallel to each other.

If the suspension and the head slider are secured together by an adhesive while maintaining the above conditions, the arm attaching surface of the suspension and the lower slider surface will be attached so that they are parallel. Further, when mounting the suspension assembly into a disk device, high-precision parallelism can be achieved. Thus, it is possible to prevent biasing of the head slider when attaching the head slider, and also to avoid fluctuations in the floating height of head slider. Further, in this embodiment, multiple head sliders can be attached at once, and the assembly time can be shortened.

Figure 13A:
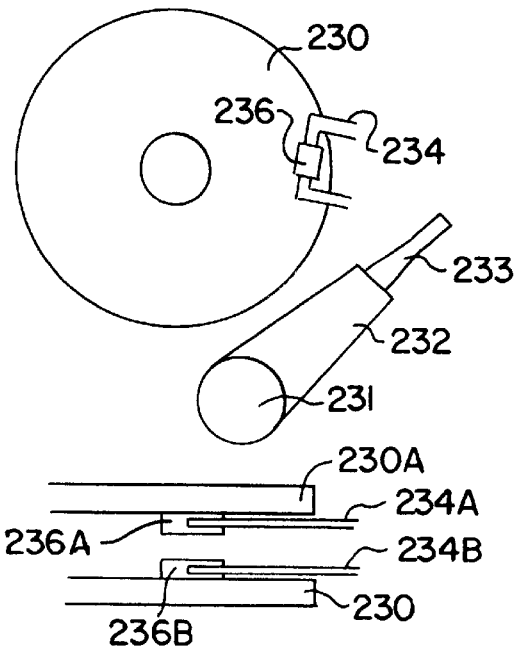
FIGS. 13(A) through 13(E) show views of the steps of the adhesion procedure of the head slider of the third embodiment.
Figure 13B:
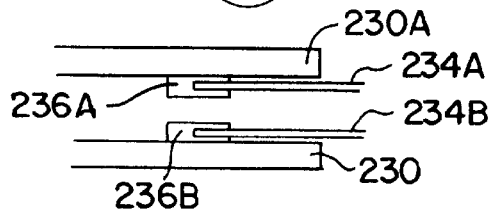
Figure 13C:
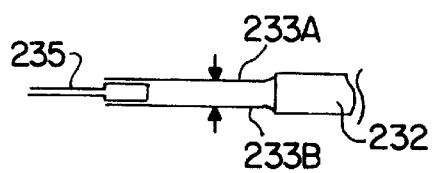
Figure 13D:
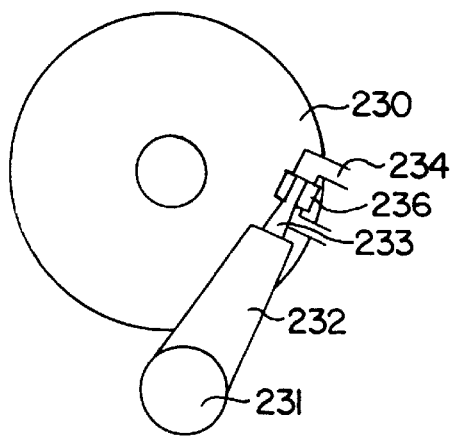
Figure 13E:
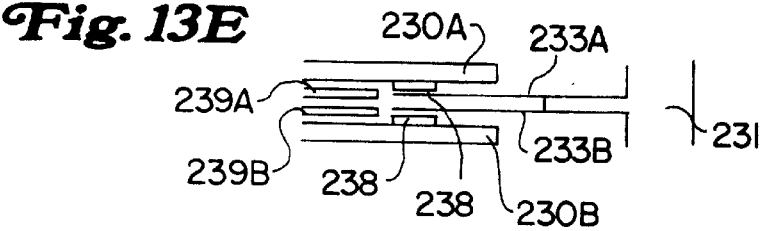

FIGS. 13(A) through 13(E) show a third embodiment of a procedure for assembling the suspension and the head slider together. In this embodiment, the head slider is being adhered to the suspension while positioned in a disk device that includes an arm and at least one disk. FIG. 13(A) shows the suspension 233 as being attached to the arm 232. The arm 233 is mounted on a carriage 231 adapted for rotating and driving the arm. The head slider 236 is mounted on the disk 230 by means of the holder 234. FIG. 13(B) shows, in cross-section, the head sliders 236A and 236B being held on the disks 230A and 230B by means of holders 236A and 236B. FIG. 13(C) shows, in cross-section, suspensions 233A and 233B being moved onto the head slider with the facing surfaces of the suspensions being held by a vacuum nozzle 235. The vacuum nozzle 235 is positioned between the two suspensions attached to the same arm. In FIG. 13(D), the arm 232 is rotated to align the suspension 233 with the head slider 236 in the radial direction. At this point, the head slider 236 is still mounted on the disk 230. FIG. 13(E) shows, in cross-section, the head sliders 236A and 236B mounted on the suspensions 233A and 233B through use of the vacuum nozzle 235 (shown in FIG. 13(C)). Adhesive nozzles 239A and 239B are used to apply adhesive 238 to the connection of the head slider and the suspension to secure them together. This same procedure is used for other suspensions. By positioning the suspension and the head slider in this manner, the arm attaching surface of the suspension lower slider surface may be kept parallel to each other.

If the suspension and the head slider are secured together with the adhesive while maintaining the above conditions, the arm attaching surface of the suspension and the lower slider surface will be attached so that they are parallel. If the head slider is adhered while the suspension is secured to the arm of a disk device, a high-precision surface parallel relationship can be achieved. Thus, with this assembly procedure, it is possible to prevent inclining the head slider while attaching the head slider to the suspension and to avoid fluctuations in the floating height of the head slider. Further, in this embodiment, the attachment of multiple head sliders at once is possible, and thus the assembly time can be shortened.

FIGS. 14(A) through 14(E) show a fourth embodiment of a procedure for assembling the suspension and the head slider together. This embodiment also shows that the head slider can be adhered to the suspension while mounted in a disk device. The present embodiment shows the attachment of multiple head sliders to multiple suspensions 223A through 223F.

Figure 14A:
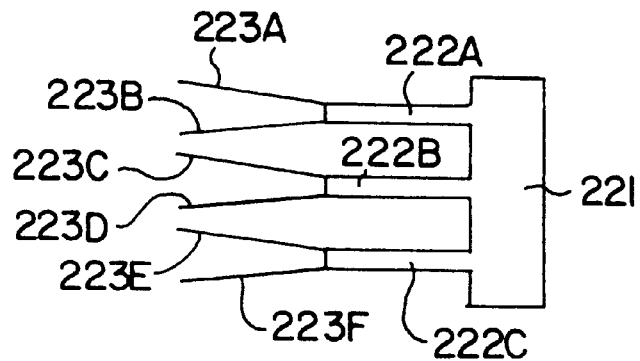
FIGS. 14(A) through 14(D) show views of the steps of the adhesion procedure of the head slider of the fourth embodiment.
Figure 14B:
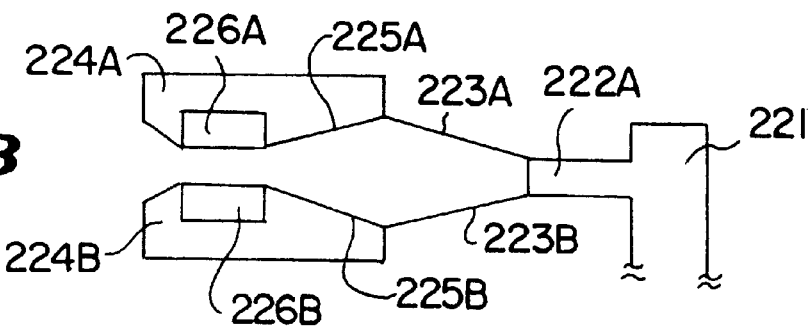
Figure 14C:
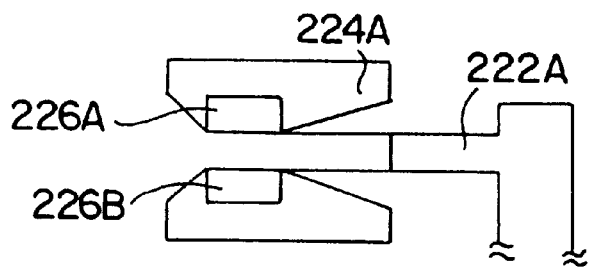
Figure 14D:
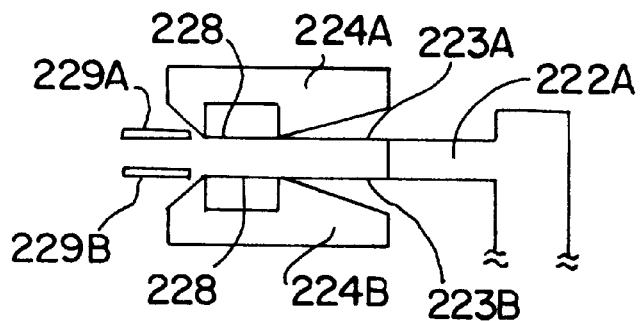

In FIG. 14(A), multiple suspensions 223A through 223F are attached to arms 222A through 222C, such that each arm supports two suspensions. The arms 222A through 222C are mounted on a carriage 221. In FIG. 14(B), the head sliders 226A and 226B are held in the grooves of the service plates 224A and 224B. The service plates 224A and 224B are provided with slopes 225A and 225B. When the service plates 224A and 224B move between the suspensions 223A and 223B, the suspension moves along this slope and is lead to the position where the head slider is mounted. In FIG. 14(C), the suspensions 223A and 223B and the head sliders 226A and 226B have been positioned with respect to the suspensions 223A and 223B so that they are properly aligned in both the longitudinal direction, as well as in the left-right direction. In FIG. 14(D), nozzles 229A and 229B are used to apply the adhesive 238 at the interface between the head slider and the suspension to secure them together, so that and withdraw the service plates 224A and 224B can be withdrawn. Other head sliders are adhered to the suspensions by using the same procedure. By positioning the suspension and the head slider in this manner, the arm attaching surface of the suspension and the surface of the head slider facing the disk may be held parallel. Similar benefits to those described with respect to the third embodiment attaching procedure can also be achieved with this fourth embodiment of the attaching procedure.

Figure 15A:
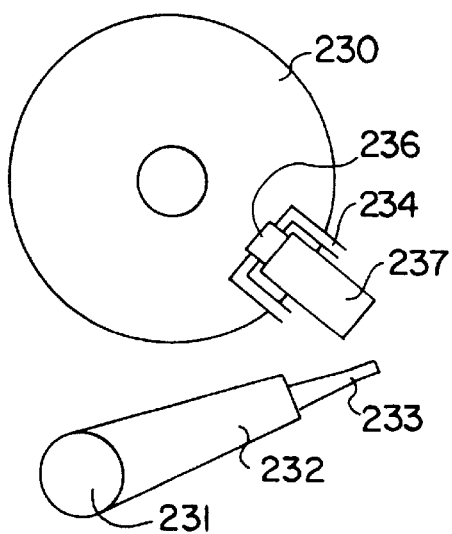
FIGS. 15(A) through 15(B) show views of the steps of the adhesion procedure of the head slider of the fifth embodiment.
Figure 15B:
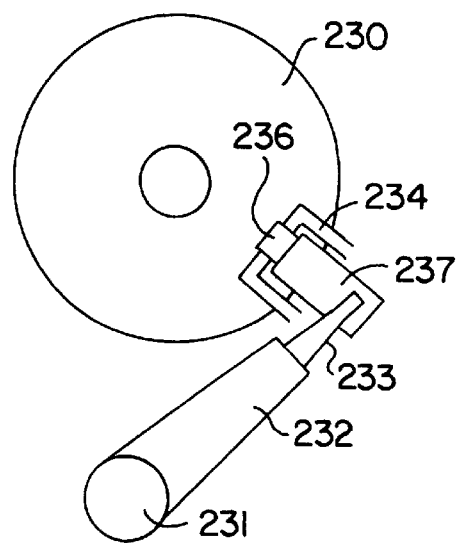

FIGS. 15(A)–(B) show a fifth embodiment of a procedure for attaching the suspension and the head slider together. This embodiment shows the head slider adhered to the suspension in a disk device with an arm and a disk.

FIG. 15(A) shows one of multiple suspensions 233 that are mounted to arm 232. The arm 232 is in turn mounted on a carriage 231 that is configured for driving the arms. Referring now to FIG. 15(B), a slope 237 (shown in cross-section in FIGS. 16(A) through 16(B)) is shown as being provided near a holder 234. When the suspension 233 is rotated toward the center of disk 230 by the arm 232, the suspension 233 moves along the slope 237, and is led to a position where the head slider 236 is mounted upon the suspension 233. As in the embodiment of FIGS. 14(A)–14(D), a nozzle is used to apply adhesive to the area of connection between the head slider and the suspension to secure them together, and the holder 234 and the slope 237 are withdrawn. Other suspensions in the disk device are adhered to their associated head sliders by using this same procedure. By positioning the suspension and the head slider in this manner, the arm attaching surface of the suspension and the surface of the head slider facing the disk can be held parallel. This embodiment also achieves the same benefits, such as those related to maintaining a parallel relationship between the arm attaching surfaces and lower the slider surfaces, as described in previous embodiments.

Figure 16A:
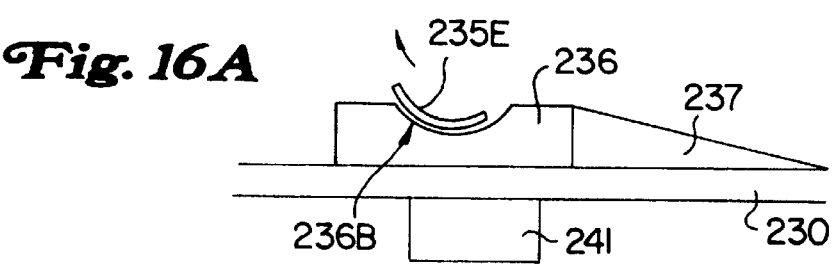
FIGS. 16(A) through 16(B) show views of the steps of the adhesion procedure of the head slider of the sixth embodiment.
Figure 16B:
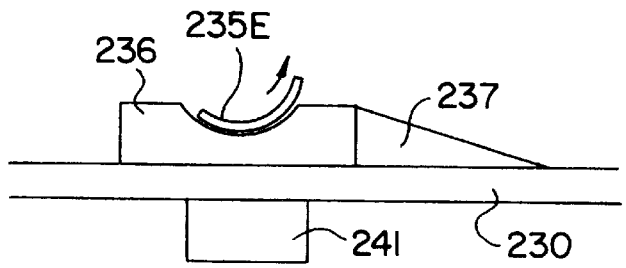

FIGS. 16(A) through 16(E) show a sixth embodiment of a procedure for attaching the suspension and the head slider together. This embodiment is essentially the same as the embodiment of FIGS. 15(A) through 15(B) except this embodiment also includes a shaker 241. FIGS. 16(A) through 16(B) are essentially a cross-section of FIGS. 15(A) through 15(B), except for the shaker 241.

Referring back to FIGS. 16(A) through 16(B), the head slider 236 is firmly held by the holder 234. The suspension attaching surface of the head slider 236 has a curved surface 236B (FIG. 16(B)) formed of a depressed groove in substantially the shape of the inner circumference of a cylinder. The slider attaching surface of the suspension 233 has a curved surface 235E shaped generally as the outer circumference of cylinder. After the slider attaching surface moves along the slope 237, the curved surface 235E engages the curved surface 236B. If the friction between the suspension and the head slider overcomes the torsional rigidity of the suspension, the suspension will be twisted. If both the suspension 11 and the slider are adhered to each other in this fluctuation occurs when the suspension assembly is put to use in a disk drive.

In the present embodiment, to overcome the friction between the slider and the suspension, shaker 241 vibrates the area of connection between the head slider and the suspension, preferably with a vibratory motion parallel to the surface of the disk. The arrows in FIGS. 16(A)–16(B) represent the suspension moving as it vibrates and rotates, with the curved surface 235E following the arc. By applying vibration, an air space is created between the suspension and the head slider to cancel out the friction between them, and by use of its spring stress (torsional rigidity), the head slider attaching surface of the suspension can be returned to a stable torsion state. If the suspension and the head slider are adhered under this condition, since the torsion is absorbed in the head slider attaching surface, it is possible to cancel out the effects of torsion on head slider and the arm attaching part. If the vibration imparting technique of this embodiment is applied to the attaching procedures of the other five embodiments, torsion can be more effectively mitigated. This can also be applied to a variety of combinations of other shapes of suspensions and head sliders. It is possible to increase the shaking frequency (to a frequency of, for example, 8 KHz, and more effectively, to at least 10 KHz) of the shaker to a value higher than the resonant vibration of the suspension (of, for example 5 KHz), and to apply the vibration perpendicular to the connection between the head slider and the suspension. For controlling resonance of the suspension during shaking, the shaking frequency must not be an integer multiple of the resonant frequency of the suspension. If the technology of the above shown attaching procedures of embodiments one through six are employed, the head assemblies of the technology shown in embodiments one through eight can be made, and any residual torsion during adhesion can be removed. Further, it is possible to arrange the arm attaching surface of the support plate in parallel to the surface of the head slider facing the disk by means of a simple assembly structure, or by mounting them onto the actual disk device. Thus, the present invention can be expected to enhance the attaching precision of the head slider and to stabilize the floating characteristics of the head slider.

In summary with the present invention, it is possible to arrange the surface of the head slider facing the disk to be parallel to the disk surface, and as a result, the read/write element will be held at a predetermined distance from the recording film of the disk. Thus, the floating height of the head slider can be held at a constant distance from both the inner and outer sides of the disk. Accordingly, it is possible to enhance the recording and reading efficiency, durability, and reliability of the disk device by reducing the frequency of contact between the head slider and the disk.

While various embodiments of the present invention have been shown and described, it should be understood that other modification, substitutions and alternatives may be apparent to one of ordinary skill in the art. Such modifications, substitutions and alternatives can be made from the appended claims. Various features of the invention are set forth in the appended claims.

What is claimed is:

1. A head assembly comprising:
   a head slider with a read/write element for reading/recording information to/from a disk;
   a suspension for supporting the head slider, said suspension including a generally planar sheet that extends in a longitudinal direction from a first end to a second end;
   an arm attaching portion positioned near said first end of said generally planar sheet of said suspension, said arm attaching portion being adapted to be attached to a head arm; and
   a slider attaching portion positioned near said second end of said generally planar sheet of said suspension, said slider attaching portion extending generally in said longitudinal direction and being surrounded by a generally U-shaped opening in said generally planar sheet, said slider attaching portion facing a securing surface of said head slider;
   wherein both said slider attaching portion of said suspension and said securing surface of said head slider include a nonplanar portion, and further wherein said head slider and said suspension are affixed to each other at said nonplanar portions, whereby the effects of torsion upon the alignment of said head slider are mitigated by said nonplanar portions.

2. The head assembly defined in claim 1, wherein said nonplanar portions are curved along said longitudinal direction.

3. The head assembly defined in claim 1, wherein said nonplanar portion of said slider attaching portion is curved along said longitudinal direction to define a convex surface that faces said securing surface of said head slider.

4. The head assembly defined in claim 3, wherein said nonplanar portion of said securing surface of said head slider is curved along said longitudinal direction to define a concave surface thereon for seating said convex surface of slider attaching portion of said suspension.

5. The head assembly defined in claim 4, wherein said convex surface and said concave surface are both of approximately the same radius of curvature.

6. The head assembly defined in claim 4, wherein the radius of curvature of said convex surface is greater than the radius of curvature of said concave surface.

7. The head assembly defined in claim 4, wherein the radius of curvature of said concave surface is greater than the radius of curvature of said convex surface.

8. The head assembly defined in claim 3, further comprising a positioning wall located at one end of said securing surface of said head slider, wherein said positioning wall aids in the positioning of the slider attaching portion upon the securing surface of the head slider by providing a surface for an end of said slider attaching portion to abut against during assembly.

9. The head assembly defined in claim 1, wherein said nonplanar portion of said slider attaching portion is curved along said longitudinal direction to define a concave surface that faces said securing surface of said head slider.

10. The head assembly defined in claim 9, wherein said nonplanar portion of said securing surface of said head slider is curved along said longitudinal direction to define a convex surface thereon for seating said concave surface of slider attaching portion of said suspension.

11. The head assembly defined in claim 10, wherein said convex surface and said concave surface are both of approximately the same radius of curvature.

12. The head assembly defined in claim 10, wherein the radius of curvature of said convex surface is greater than the radius of curvature of said concave surface.

13. The head assembly defined in claim 10, wherein the radius of curvature of said concave surface is greater than the radius of curvature of said convex surface.

14. The head assembly defined in claim 9, further comprising a stepped portion located at one end of said securing surface of said head slider, wherein said stepped portion aids in the positioning of the slider attaching portion upon the securing surface of the head slider by providing a surface for an end of said slider attaching portion to abut against during assembly.

15. The head assembly defined in claim 1, wherein said slider attaching portion and said securing surface contact each other along at least two lines thereon.

16. The head assembly defined in claim 1, wherein said suspension further includes an arm attaching surface for attaching said suspension to an arm of a disk device, and further wherein said head slider includes a lower surface that faces in an opposite directing from said securing surface, such that said arm attaching surface of said suspension and said lower surface of said head slider are maintained in a generally parallel relationship to each other.

17. An information storage device comprising:
   a storage media for storing information;
   a head slider with a read/write element for reading/recording information to/from said storage media;
   a suspension for supporting the head slider, said suspension including a generally planar sheet that extends in a longitudinal direction from a first end to a second end;
   an arm attaching portion located near said first end of said generally planar sheet of said suspension, said arm attaching portion being adapted to be attached to a head arm;
   a slider attaching portion positioned near said second end of said generally planar sheet of said suspension, said slider attaching portion extending generally in said longitudinal direction and being surrounded by a generally U-shaped opening in said generally planar sheet, said slider attaching portion facing a securing surface of said head slider;
   wherein both said slider attaching portion of said suspension and said securing surface of said head slider include a curved portion, and further wherein said head slider and said suspension are affixed to each other at said curved portions, whereby the effects of torsion upon the alignment of said head slider are mitigated by said curved portions;
   a head arm for supporting said suspension, whereby said first end of said suspension is attached to a free end of said head arm; and
   a motor for moving said head arm to enable said head slider to access different areas of said storage media.

18. The information storage device defined in claim 17, wherein said suspension further includes an arm attaching surface for attaching said suspension to said head arm, and further wherein said head slider includes a lower surface that faces in an opposite direction from said securing surface, such that said arm attaching surface of said suspension and said lower surface of said head slider are maintained in a generally parallel relationship to each other.

* * * * *

UNITED STATES PATENT AND TRADEMARK OFFICE
CERTIFICATE OF CORRECTION

PATENT NO. : 6,330,134 B2
DATED : December 11, 2001
INVENTOR(S) : Kameyama

It is certified that error appears in the above-identified patent and that said Letters Patent is hereby corrected as shown below:

<u>Column 22,</u>
Line 21, delete the word "directing" and insert -- direction -- therefor.

Signed and Sealed this

Twenty-eighth Day of May, 2002

*Attest:*

JAMES E. ROGAN
*Attesting Officer*     *Director of the United States Patent and Trademark Office*